US009727933B1

(12) United States Patent
Smith

(10) Patent No.: US 9,727,933 B1
(45) Date of Patent: Aug. 8, 2017

(54) SYSTEM FOR PROVIDING THREE-DIMENSIONAL RESERVE STUDIES TO COMMON INTEREST DEVELOPMENT OWNERS AND MANAGEMENT

(71) Applicant: CIDOLOGY Inc., Pleasanton, CA (US)

(72) Inventor: Brian David Smith, Livermore, CA (US)

(73) Assignee: CIDology Inc., Pleasanton, CA (US)

( * ) Notice: Subject to any disclaimer, the term of this patent is extended or adjusted under 35 U.S.C. 154(b) by 618 days.

(21) Appl. No.: 14/182,294

(22) Filed: Feb. 18, 2014

Related U.S. Application Data

(60) Provisional application No. 61/765,652, filed on Feb. 15, 2013.

(51) Int. Cl.
*G06Q 10/10* (2012.01)
*G06Q 10/00* (2012.01)
*G06F 17/50* (2006.01)
*G06Q 50/16* (2012.01)

(52) U.S. Cl.
CPC .......... *G06Q 50/163* (2013.01); *G06Q 10/10* (2013.01)

(58) Field of Classification Search
CPC ........ G06Q 40/04; G06Q 20/10; G06Q 40/02; G06Q 40/12; G06Q 30/02; G06Q 10/067; G06Q 10/06375; G06Q 10/0639; G06Q 50/163; G06Q 50/16; G06Q 10/10; G06Q 10/00; G06Q 10/06; G06F 17/5004; G06F 17/50; G06F 2217/06
See application file for complete search history.

(56) References Cited

U.S. PATENT DOCUMENTS

2011/0264649 A1* 10/2011 Hsiao .................. G06N 5/022
707/722
2013/0103580 A1* 4/2013 Ventura ................ G06Q 40/02
705/40

* cited by examiner

Primary Examiner — Maroun Kanaan
(74) *Attorney, Agent, or Firm* — Imperium Patent Works; Amir V. Adibi

(57) ABSTRACT

A member of a Common Interest Development (CID) provides login credentials to an application server using a network-enabled device. For example, the CID is a residential condominium and the managing member is a Home Owners Association (HOA) board member. If authentication is successful, then the application server serves a three-dimensional reserve study markup language document to the device. The document renders a three-dimensional reserve study on a display of the device. The three-dimensional reserve study rendered on the display includes a three-dimensional line art diagram of the CID and a plurality of graphical elements. The graphical elements include reserve component information, such as identification information, location information, temporal information, description information, and financial information. The three-dimensional reserve study is interactive thereby allowing the board member to visually understand reserve costs for each year over a thirty year period and to persuade condominium owners to increase HOA contributions.

20 Claims, 20 Drawing Sheets

THREE-DIMENSIONAL RESERVE STUDY SYSTEM

THREE-DIMENSIONAL RESERVE STUDY SYSTEM

THREE-DIMENSIONAL LINE ART DIAGRAM OF
COMMON INTEREST DEVELOPMENT (CID)
112

COMMUNICATING LOGIN CREDENTIALS AND AUTHENTICATING USER

USER SCANS VISUAL CODE (QR CODE) WITH MOBILE DEVICE

USER ACCESSES A WEB PAGE FOR THE RESERVE
COMPONENT HAVING THE AFFIXED QR CODE

THREE-DIMENSIONAL RESERVE STUDY SYSTEM
(ANOTHER EMBODIMENT)

SYSTEM FOR PROVIDING THREE-DIMENSIONAL RESERVE STUDIES TO COMMON INTEREST DEVELOPMENT OWNERS AND MANAGEMENT

CROSS REFERENCE TO RELATED APPLICATION

This application claims the benefit under 35 U.S.C. §119 of provisional U.S. patent application Ser. No. 61/765,652, entitled "System And Method For Producing Enhanced Three-Dimensional Reserve Studies," filed on Feb. 15, 2013. The subject matter of provisional U.S. patent application Ser. No. 61/765,652 is incorporated herein by reference.

TECHNICAL FIELD

The described embodiments relate generally to reserve studies.

BACKGROUND INFORMATION

A Common Interest Development (CID) is generally governed by mandatory associations that administer the property and are responsible for repairing, replacing, or maintaining the common area components. Common area components are referred to as "reserve components" and include items such as concrete walkways, awnings, or recreational pools. Many states require a reserve study to be performed on the CID that provides a current estimate of costs of repairing, replacing, and maintaining reserve components over a thirty year period. The results of the reserve study are recorded in a reserve study document and distributed to owners of the CID. The association sets aside a reserve account to cover the costs of repairing, replacing, and maintaining the reserve components of the CID.

The reserve study document provides invaluable information for responsibly managing the reserve account. For example, the reserve study document indicates whether there are sufficient funds in the reserve account or whether there is a deficit of funds in the reserve account. If there are sufficient funds in the reserve account, then the CID is considered to be well operated and each owner of the CID should continue to make the same monthly HOA contributions. If, on the other hand, there is a deficit of funds in the reserve account, then each owner of the CID should increase monthly HOA contributions. Unfortunately, typical owners of the CID have difficulty understanding the contents of the reserve study document. As a result, important financial aspects of the reserve study document are not effectively communicated to the owners who are contributing to the reserve account and who are financially responsible for the CID. An improved solution is desired.

SUMMARY

A three-dimensional reserve study system includes a three-dimensional reserve study server system and a plurality of network-enabled user systems. The three-dimensional reserve study server system includes an application server and a database. A portion of the network-enabled user systems are operated by owners of a Common Interest Development (CID), and another portion of the network-enabled user systems are operated by managing members of the CID. In one example, the CID is a residential condominium, each of the owners owns a unit of the residential condominium, and the managing members are part of a Home Owners Association (HOA) board. In another example, the CID is a business condominium.

The three-dimensional reserve study server system is operated and maintained by a three-dimensional reserve study entity. The three-dimensional reserve study entity obtains a reserve study document for the CID. The three-dimensional reserve study entity configures the three-dimensional reserve study server system using the information contained in the reserve study document for the CID. Configuring the three-dimensional reserve study server system involves generating a three-dimensional line art diagram of the CID using a Computer Aided Design (CAD) software application, storing the three-dimensional line art diagram in the database, and storing the financial information for the reserve components contained in the reserve study document in the database. In one embodiment, the reserve study is performed by another entity that conducts the study and prepares the reserve study document. In another embodiment, the three-dimensional reserve study entity performs the reserve study in addition to operating and maintaining the three-dimensional reserve study server system.

The three-dimensional reserve study server system provides the three-dimensional reserve study to managing members or owners of the CID. First, the managing member or owner of the CID supplies a pre-determined Universal Resource Locator (URL) into an Internet browser executing on the network-enabled user system. The pre-determined URL is provided by the three-dimensional reserve study entity for users to access the three-dimensional reserve study over the network. The Internet browser generates a request using the URL and communicates the request to the application server. The application server responds by supplying a login markup language document to the user system. The Internet browser renders a login web page from the login markup language document on a display of the user-system. The login web page includes a username input field and a password input field. The user supplies login credentials to a form on the login webpage and submits the form. The Internet browser generates a request thereby communicating the login credentials to the application server. If the authentication fails, then the application server prompts the user to supply valid login credentials by serving the login markup language document.

If the application server successfully authenticates the login credentials, then the application server responds by serving a three-dimensional reserve study markup language document to the user system. The Internet browser renders a three-dimensional reserve study web page from the three-dimensional reserve study markup language document. The three-dimensional reserve study web page includes a three-dimensional line art diagram of the CID and a plurality of graphical elements. Each of the graphical elements includes reserve component information.

In one example, the graphical element includes identification information that identifies a reserve component of the CID. For example, the graphical element includes text of the name of the component. In another example the graphical element includes location information that indicates where a reserve component is located on the CID. For example, the graphical element includes a line with an arrow pointing to the location of the reserve component on the three-dimensional line art diagram of the CID, or the graphical element includes color or shading that is overlaid above the location on the three-dimensional line art diagram of the CID where the reserve component is located. In yet another example the graphical element includes temporal information that indicates a year when a reserve component will yield an expense. For example, the graphical element includes text of the useful life or the remaining useful life of the reserve component. In yet another example the graphical element includes description information that describes a reserve component. For example, the graphical element includes a digital image or a textual description of the reserve component. In yet another example the graphical element includes financial information that indicates a monetary value associated with a reserve component. For example, the graphical element includes text indicating a maintenance or replacement cost for a reserve component.

The three-dimensional reserve study web page is interactive thereby allowing the board member to visually understand reserve costs for each year over a thirty year period. A graphical element allows the user to select a year over the thirty year period. After the year is selected, the three-dimensional reserve study web page responds by showing the three-dimensional line art diagram of the CID with graphical elements overlaid above the three-dimensional line art diagram that identify each reserve component that will yield an expense on the reserve account for the selected year. The user selects a graphical elements corresponding to one of the reserve components that will yield the expense, and the three-dimensional reserve study web page responds by providing additional graphical elements having further information. For example, the additional graphical elements show a description of the maintenance, repair or replacement associated with the reserve component, a digital image of the reserve component, remaining useful life of the component, a quantity of the reserve component that is present on the CID, and a total cost of the reserve component over thirty years.

The three-dimensional reserve study web page further includes a graphical component, where the graphical component is a chart. In one example, the chart identifies expenditures for a selected year. In another example, the chart indicates the percent funded for the selected year. In yet another example, the chart is a table that allows the user to view costs for each component over the thirty year period of the reserve study. In yet another example, the chart is a pie chart showing an estimated percentage of the total expenditures that will be spent on each of the reserve components throughout the thirty year period of the reserve study. In yet another example, the chart is a bar chart showing an estimated percentage of the total expenditures that will be spent on each of the reserve components in each year throughout the thirty year period of the reserve study.

The owners and the management association of the CID utilize the three-dimensional reserve study web page to understand how reserve funds are allocated for each reserve component throughout the thirty year period of the reserve study. The owners and the management do not need to read a physical document to understand the details of the reserve study. The three-dimensional reserve study web page provides the financial information for each reserve component over the thirty year period in a single web page. In addition, the three-dimensional reserve study web page indicates a contribution amount each owner makes to the reserve account each month. By using the visual and interactive features of the three-dimensional reserve study web page, the owners are provided with financial transparency allowing them to understand how their monthly contributions are spent and how the reserve account money is allocated. Moreover, the management association of the CID is able to utilize the three-dimensional reserve study web page to persuade the owners of the CID to increase the monthly contributions if the reserve account has a deficit.

In another embodiment, a database of a three-dimensional reserve study server system stores and maintains a visual code table. For each reserve component, the visual code table stores a corresponding visual code, such as a quick response (QR) code, and a unique URL that is encoded in the QR code. The URL is a link to a web page served by an application server of the three-dimensional reserve study server system. The web page is a part of the three-dimensional reserve study and includes reserve component information for the reserve component having the affixed QR code. Each of the QR codes are printed and affixed to the respective reserve component according to the visual code table. A user with a network-capable device having a camera scans the QR code that is affixed to a reserve component of interest to the user. The network-capable device decodes the QR code to obtain a URL. The URL is used to access a web page with the reserve component information of the reserve component that is of interest to the user.

The visual code table is maintained such that the table is updated to include a QR code and a URL for any new or replaced reserve component on the CID. For example, if a reserve component is added to the CID, the reserve component is registered with the application server such that the three-dimensional reserve study is updated to include reserve component information for the new reserve component. A web page having the new reserve component information is generated. A QR code is generated that encodes a URL of the web page. The application server updates the visual code table by inserting a new record into the table that includes an identifying label for the new reserve component, the generated QR code, and the URL that is encoded in the QR code. A member of the CID management prints the QR code for the new reserve component and affixes the QR code onto the new reserve component. When a member of the CID scans the QR code with a network-enabled device, the member will be linked to the web page of the new reserve component.

In another embodiment, an application server of a three-dimensional reserve study server system includes an amount of processor executable instructions also for performing Optical Character Recognition (OCR) and text processing. A member of the CID management uploads a reserve study document to the application server via the network. The reserve study document is typically stored in digital form as a PDF document. The amount of processor executable instructions comprises instructions for an OCR engine and instructions for a text processing engine. The OCR engine processes the uploaded reserve study document to obtain machine-readable text from the reserve study document. The text processing engine uses the machine-readable text obtained from the OCR engine to extract all necessary information from the reserve study to generate a thirty year cost table for all reserve components. In this fashion, the OCR engine avoids the need for manual entry of monetary information for each reserve component of the reserve study. The management member need only upload the reserve study document, and the amount of processor executable instructions causes the monetary information for each reserve component to be extracted and stored in a database of the three-dimensional reserve study server system. The extracted monetary information is used to generate and serve the three-dimensional reserve study to a user system.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
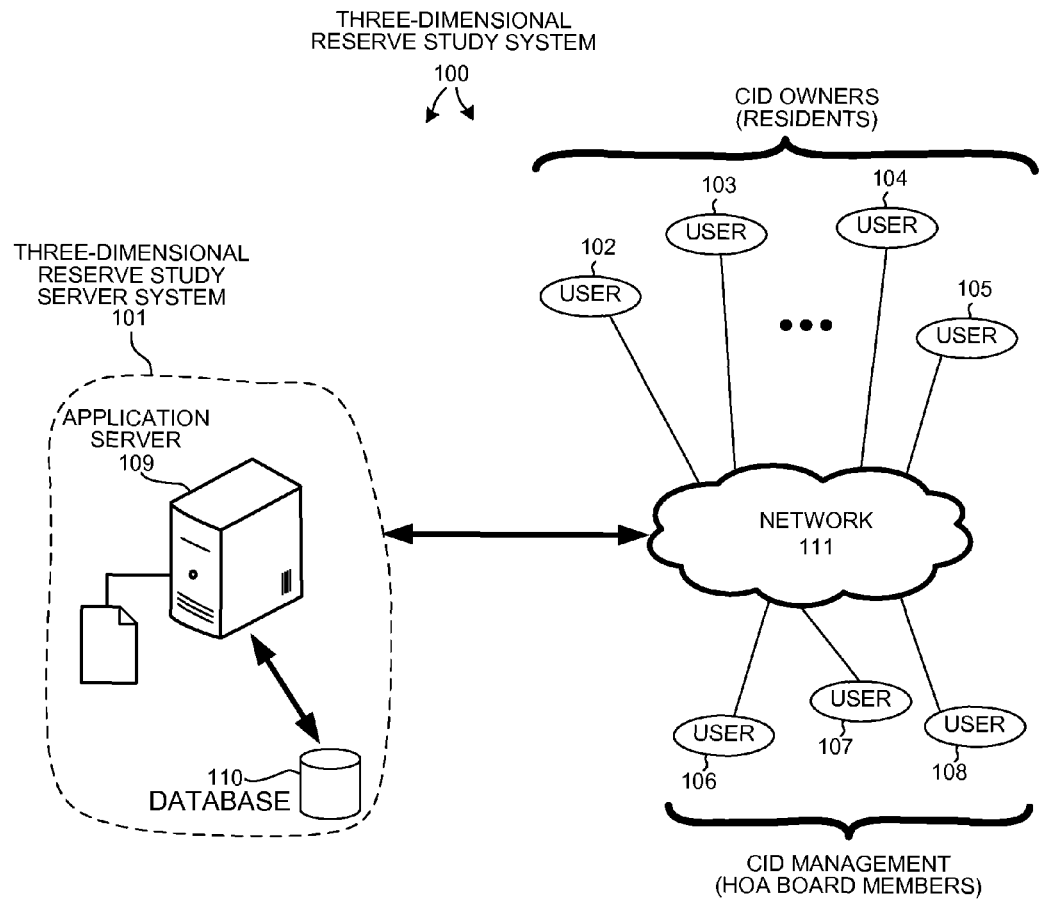
FIG. 1 is a diagram of one embodiment of a three-dimensional reserve study system 100.

FIG. 1 is a diagram of one embodiment of a three-dimensional reserve study system 100. The three-dimensional reserve study system 100 includes a three-dimensional reserve study server system 101 and network-enabled user systems 102-108. The three-dimensional reserve study server system 101 comprises an application server 109 and a database 110. The network-enabled user systems 102-108 communicate with the three-dimensional reserve study server system 101 via a network 111. The network-enabled user systems 102-105 are operated by individuals who have an ownership interest in a Common Interest Development (CID). The network-enabled user systems 106-108 are operated by CID management. In this example, the CID is a condominium complex. Each of the users of network-enabled user systems 102-105 owns a condominium unit of the CID and resides in the condominium unit. Each of the users of network-enabled user systems 106-108 is a board member of a Home Owners Association (HOA) of the CID. Although a typical condominium complex has many more owners, the example of FIG. 1 shows only four owners to simplify the explanation.

Figure 2:
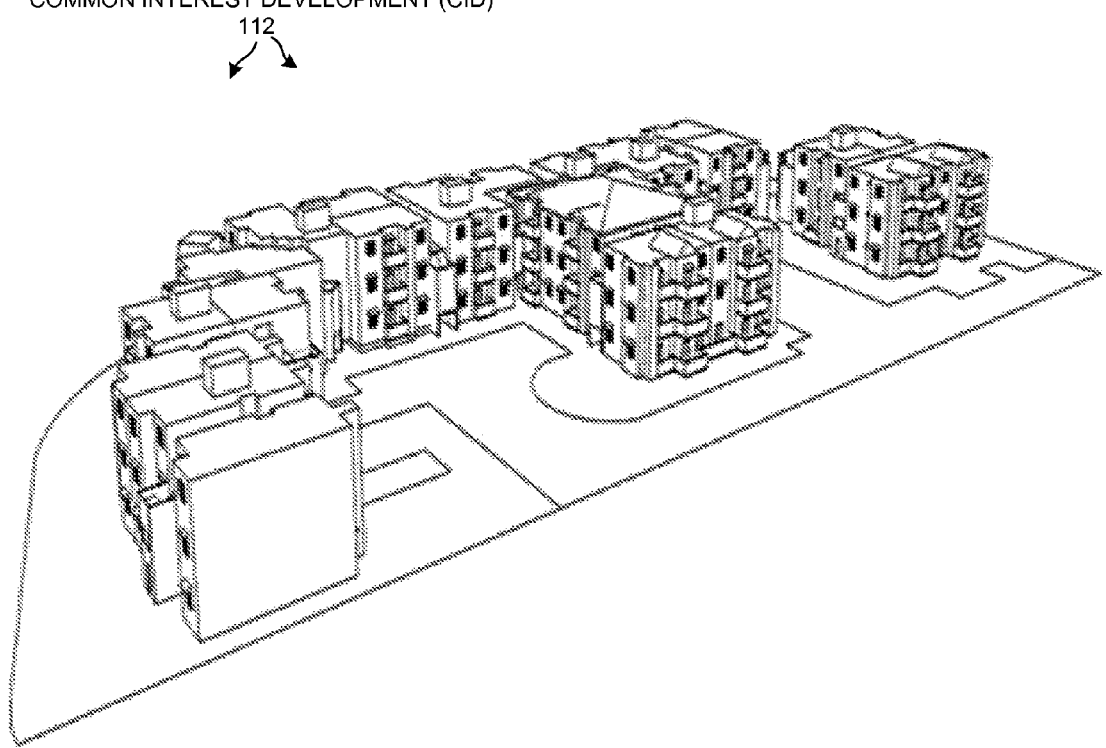
FIG. 2 is a three-dimensional line art diagram 112 of the CID.

FIG. 2 is a three-dimensional line art diagram 112 of the CID. The three-dimensional line art diagram is a visual representation of the CID that is renderable on a display of a user system. In the example of FIG. 2, the three-dimensional line art diagram 112 is generated using a Computer Aided Design (CAD) software application. Examples of CAD software applications are Revit (available from http://www.autodesk.com/products/) and SketchUp (available from http://www.sketchup.com/). The three-dimensional line art diagram 112 is stored as digital image in the database 110 of the three-dimensional reserve study server system 101 (see FIG. 1). The three-dimensional line art diagram 112 is accessible by the application server 101 (see FIG. 1) as set forth below.

Figure 3:
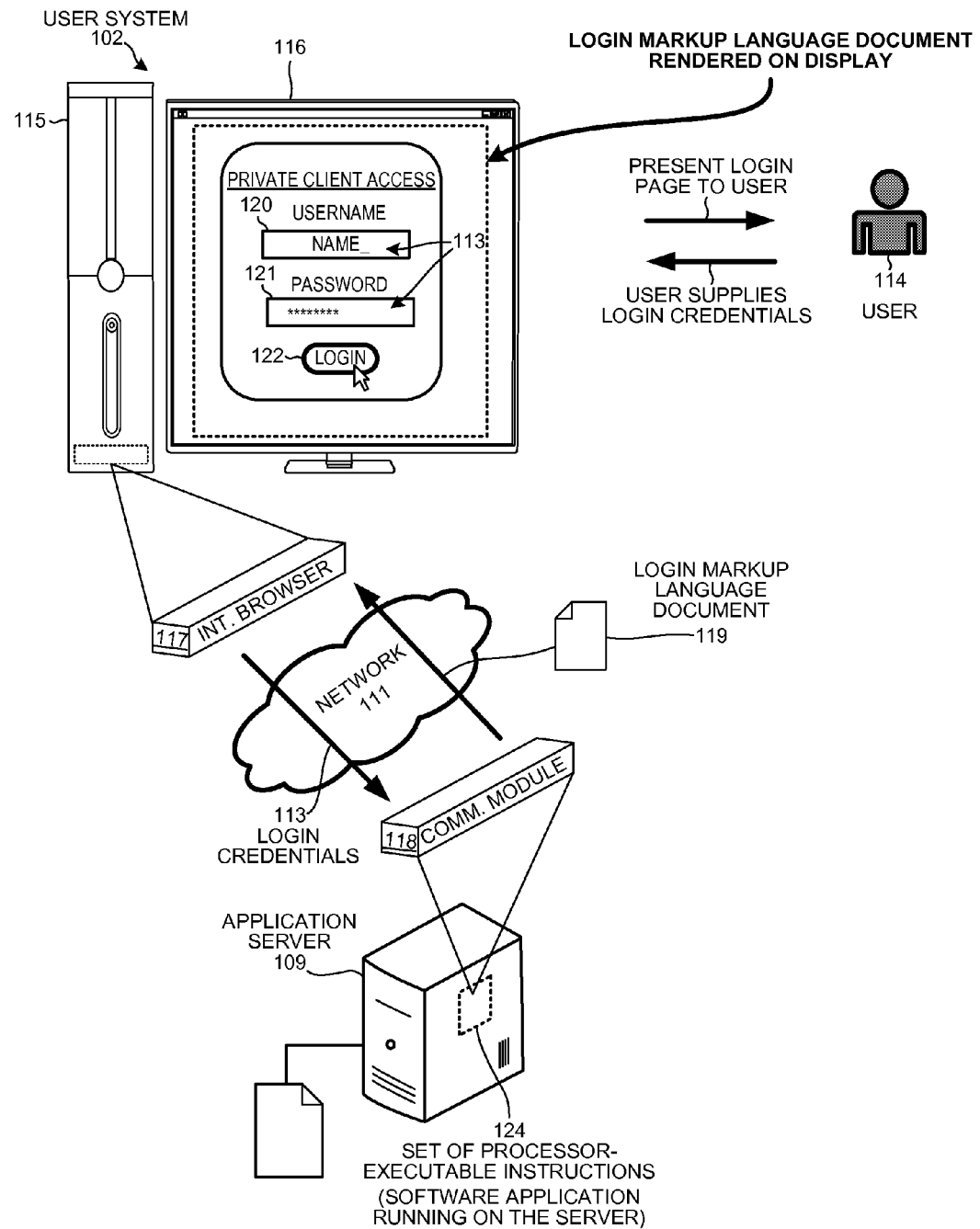
FIG. 3 is a diagram showing how the user system 102 communicates login credentials 113 supplied from a user 114 to the application server 109 and how the application server 109 authenticates the user 114.

FIG. 3 is a diagram showing how the user system 102 communicates login credentials 113 supplied from a user 114 to the application server 109 and how the application server 109 authenticates the user 114. The user system 102 comprises a desktop Personal Computer (PC) 115 and a display 116. The application server 109 includes a set of processor-executable instructions 124 executing on application server 109. The application server 109 executes the set of instructions 124 causing the application server 109 to receive and handle hypertext transfer protocol (HTTP) requests, and to serve markup language documents that are executable on an Internet browser.

The user 114 enters a pre-determined Universal Resource Locator (URL) into an Internet browser 117 executing on the PC 115. The Internet browser 117 generates an HTTP GET request (not shown) using the URL and communicates the GET request over network 111 to a communication module 118 of the application server 109. In response to receiving the GET request, the application server 109 generates a login markup language document 119 and communicates the login markup language document 119 over network 111 to the Internet browser 117 executing on the user system 102. In this example, the markup language document 119 is a hypertext markup language (HTML) document. The HTML document defines a structure and layout of a Web document using tags and attributes that an HTML rendering engine interprets when processing contents of an HTML document. The Internet browser 117 employs an HTML rendering engine (not shown) to render the contents of the login HTML document to display 116.

Figure 4:
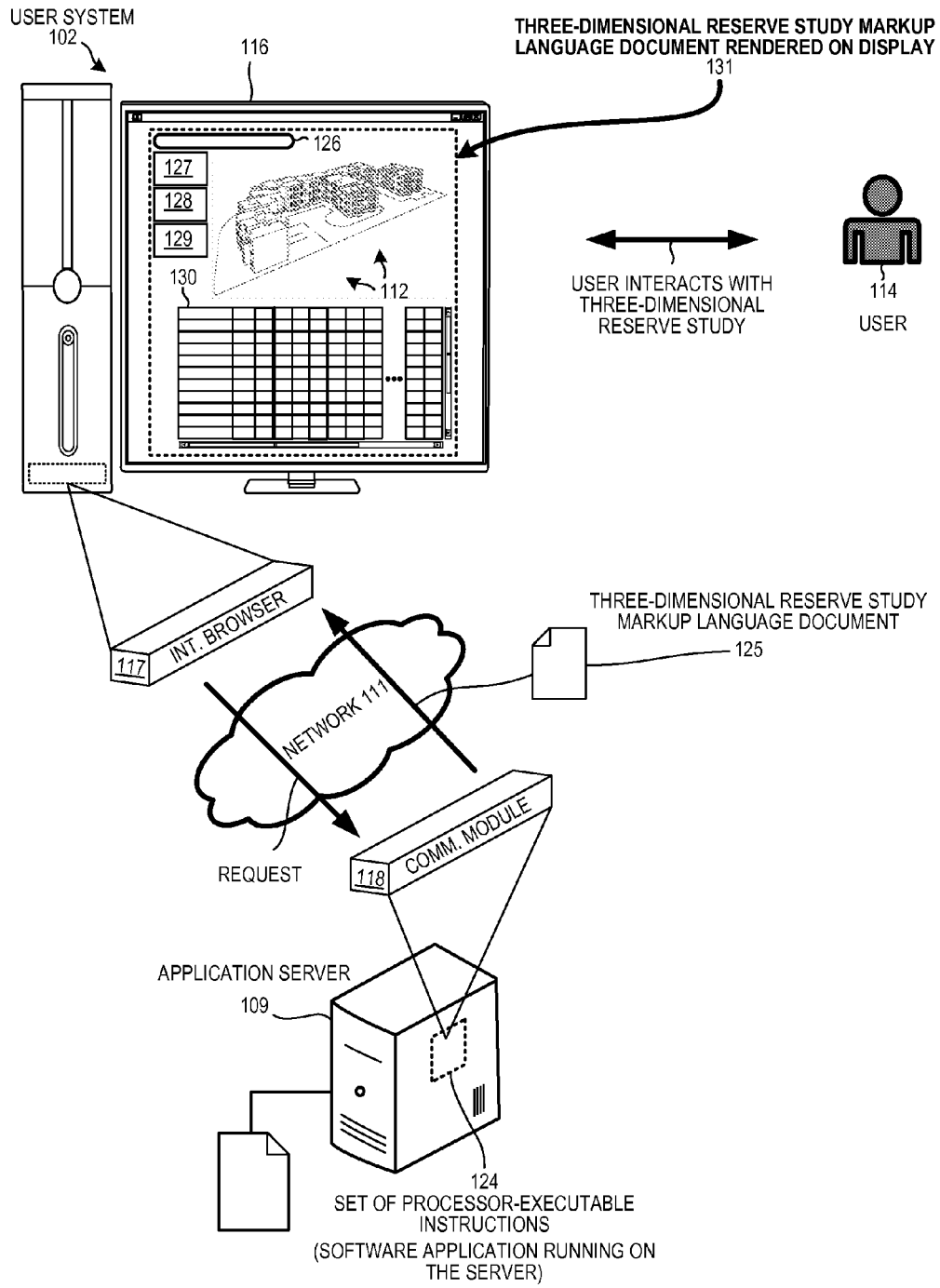
FIG. 4 is a diagram showing how the application server 109 serves a three-dimensional reserve study markup language document 125 to the user system 102 of user 114 via the network 111.

The Internet browser 117 renders the login markup language document 119 on the display 116, including a username input field 120, a password input field 121 and a login button 122. The username input field 120 is an HTML input element having a text attribute type. The password input field 121 is an HTML input element having a password attribute type. The login button 122 is an HTML input element having a submit attribute type. The user 114 inputs a username into the username input field 120 and a password into the password input field 121. The username and password form login credentials 113. Next, the user 114 selects the login button 122 causing the Internet browser 117 to generate a POST request thereby communicating the login credentials 113 to the communication module 118 of the application server 109. Reference numeral 113 identifies the POST request comprising the login credentials 113 the Internet browser 117 communicates to the application server 109. The application server 109 attempts to authenticate the login credentials 113 of user 114. If the authentication is successful, then the application server 109 responds by serving a three-dimensional reserve study markup language document to the user system 102 as shown in FIG. 4. Otherwise, if the authentication fails, then the application server 109 prompts the user 114 to supply valid login credentials.

FIG. 4 is a diagram showing how the application server 109 serves a three-dimensional reserve study markup language document 125 to the user system 102 of user 114 via the network 111. In one example, the three-dimensional reserve study markup language document 125 is an HTML document. The Internet browser 117 employs an HTML rendering engine to render the contents of the three-dimensional reserve study HTML document 125 to the display 116, including the three-dimensional line art diagram 112 of the CID and graphical elements 126-130. The rendered three-dimensional reserve study HTML document 125 is a "three-dimensional reserve study web page" and is identified by reference numeral 131. The three-dimensional reserve study web page 131 is "three-dimensional" because of the three-dimensional line art diagram 112 that is rendered on the display 116. The three-dimensional reserve study web page 131 is also referred to as a "three-dimensional reserve study", an "interactive reserve study web page", or an "interactive three-dimensional reserve study web page" because HTML document 125 is responsive to user input, as explained in further detail below.

Each of the graphical elements 126-130 includes reserve component information of the CID. The reserve component information is information obtained from performing a reserve study on a CID. The reserve component information includes: identification information that identifies a reserve component of the CID (for example, the name of the component); location information indicating where a reserve component is located on the CID (for example, a line with an arrow and shading or color used to identify the reserve component); temporal information indicating a year when a reserve component will yield an expense (for example, the useful life or the remaining useful life of the reserve component); description information that describes a reserve component (for example, a digital image or textual description); and financial information indicating a monetary value associated with a reserve component (for example, maintenance or replacement costs). The reserve study is typically performed by a third-party separate from a three-dimensional reserve study provider. The three-dimensional reserve study provider may, however, perform the reserve study. The reserve study is a printed document and the information contained within the printed document is used by the three-dimensional reserve study provider to configure the application server 109 to provide the three-dimensional reserve study.

A reserve component, also referred to as a common area component, is any item that the CID management (for example, the HOA board) is responsible to maintain or replace and has an estimated useful life greater than one year and less than thirty years at the time of the reserve study. Examples of reserve components include breezeways, balcony decks, asphalt, concrete walkways, light posts, wall lights, garage lights, awnings, mailboxes, perimeter fences, balcony and patio fences, pool fences, trellises, trash enclosure gates, garage doors, utility doors, garage gates, landscaping, gutters, playground equipment, public bathrooms, clubhouse rooms, pools, spas, solar panels, HVAC units, gate operators, water heaters, irrigation timeclocks, fire alarm systems, $CO_2$ systems, and exhaust fans. The above list is provided merely for instructional purposes and is not intended to be a complete list of reserve components. Other CIDs may include more or less reserve components than those listed above or may include other reserve components that are not listed above.

Figure 5:
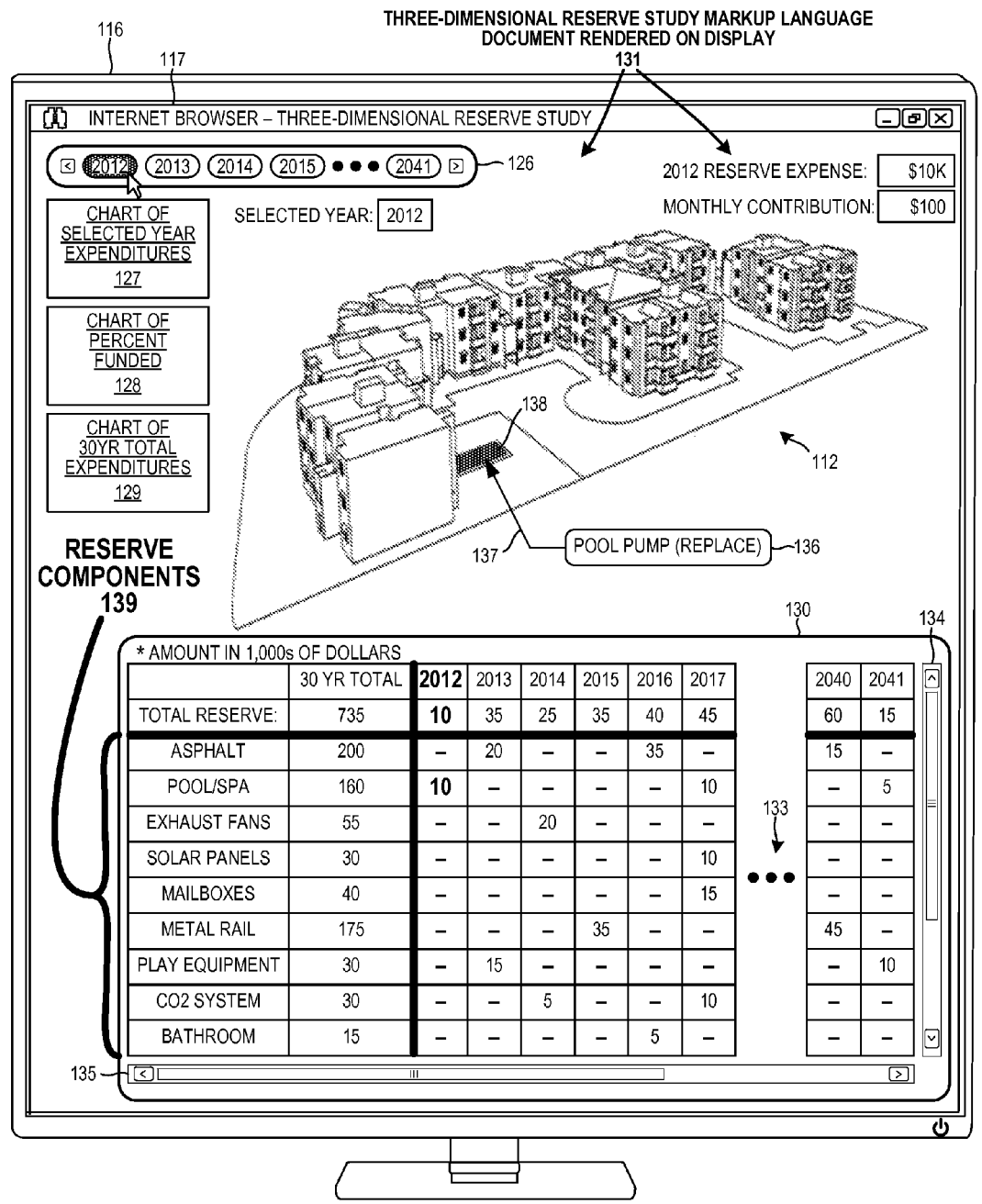
FIG. 5 is a diagram of the three-dimensional reserve study web page 131 rendered on display 116.

FIG. 5 is a diagram of the three-dimensional reserve study web page 131 rendered on display 116. The three-dimensional reserve study web page 131 includes the three-dimensional line art diagram 112, and graphical elements 126-130 and 133-135. The graphical element 126 is a navigation bar used to select a year. In the example of FIG. 5, the year selected is "2012". The graphical element 127 is a chart of expenditures for the selected year "2012" (see FIG. 8 for a more detailed diagram of chart 127). The graphical element 128 is a chart indicating the percent funded for the selected year "2012" (see FIG. 9 for a more detailed diagram of chart 128). The graphical element 129 is a chart of expenditures for all thirty years of the reserve study (see FIG. 10 for a more detailed diagram of chart 129). The graphical element 130 is a chart indicating monetary and financial information for each of the plurality of reserve components 139 of the CID. The monetary information includes actual costs (for years past) and estimated costs (for future years). Reference numeral 133 identifies ellipses to show that in actual implementation, the user 114 may use scroll bars 134 and 135 to view all monetary information for all the reserve components across all thirty years of the reserve study on a single web page.

Graphical elements 136, 137, and 138 provide information regarding one reserve component of the CID. The graphical element 136 provides identification information of a reserve component. In this example, the graphical element 136 is a label "POOL PUMP (REPLACE)" indicating that in selected year 2012, the pool pump reserve component will need to be replaced thereby yielding a cost on the reserve account of the CID. The replacement cost is ten thousand dollars as indicated in chart 130. In other embodiments, the cost may also be part of the label 136. The graphical element 137 is a line and arrow identifying the location of where the reserve component is located on the CID. In this example, the line and arrow 137 identifies where the "POOL PUMP" is located on the CID. The graphical element 138 is shading also for identifying the location of where the pool pump reserve component is located on the CID.

In the embodiment of FIG. 5, the three-dimensional line art diagram 112 and the graphical elements 136, 137, and 138 form a single digital image. The single digital image is rendered from an HTML image element contained in the three-dimensional reserve study HTML document 125, such as an HTML <IMG> element or set as a background image of an HTML <DIV> element. In another embodiment, the three-dimensional line art diagram 112 is a digital image and each of the graphical elements 136, 137, 138 are rendered from HTML <DIV> elements contained in the three-dimensional reserve study HTML document 125. The HTML elements 136, 137, and 138 are overlaid above the three-dimensional line art diagram digital image, and the HTML elements 136, 137, and 138 are stylized according to a style sheet language document, such as a Cascading Style Sheets (CSS) document.

Figure 6:
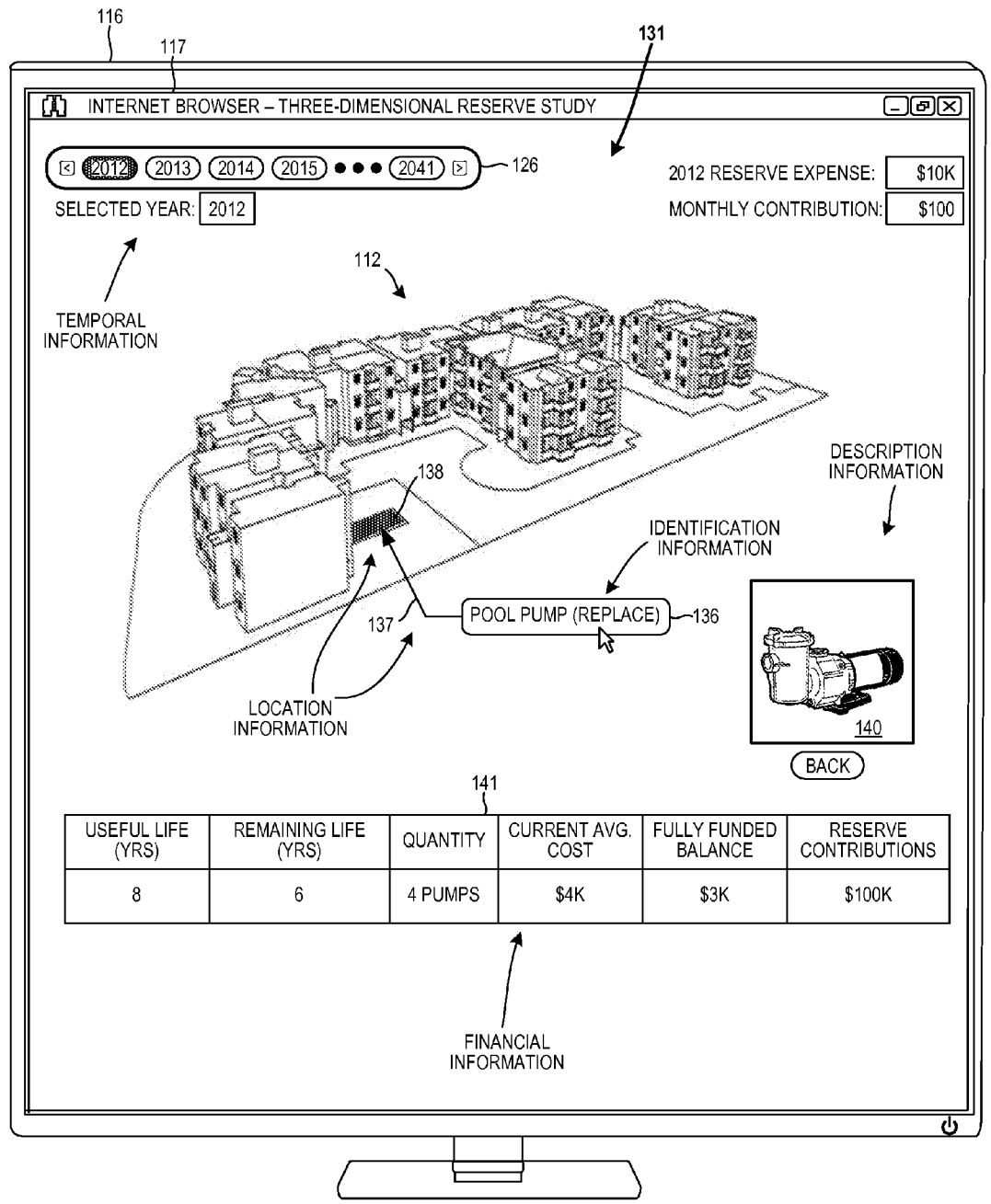
FIG. 6 is a diagram showing an interactive aspect of the three-dimensional reserve study web page 131.

FIG. 6 is a diagram showing an interactive aspect of the three-dimensional reserve study web page 131. The three-dimensional reserve study web page 131 detects an input event, such as a click event or a touch event. In response to detecting an input event on the graphical element 136, additional graphical elements 140 and 141 are rendered on the display 116 thereby providing additional information for the reserve component. In this example, the user 114 selects the graphical element 136 resulting in additional graphical elements 140 and 141 being rendered on the display 116. The graphical element 140 is a digital image of the reserve component. The graphical element 141 is a chart indicating a useful life of a reserve component, a remaining life of the reserve component, a quantity of units of the reserve component present on the CID, a current average cost of the reserve component, a fully funded balance of the reserve component, and an amount of reserve contributions for the reserve component. Accordingly, three-dimensional reserve study web page 131 is referred to as "interactive" because selecting one of a plurality of graphical elements results in the rendering of the additional graphical elements that provide the user 114 with additional information regarding a particular reserve component that is of interest to the user 114.

Figure 7:
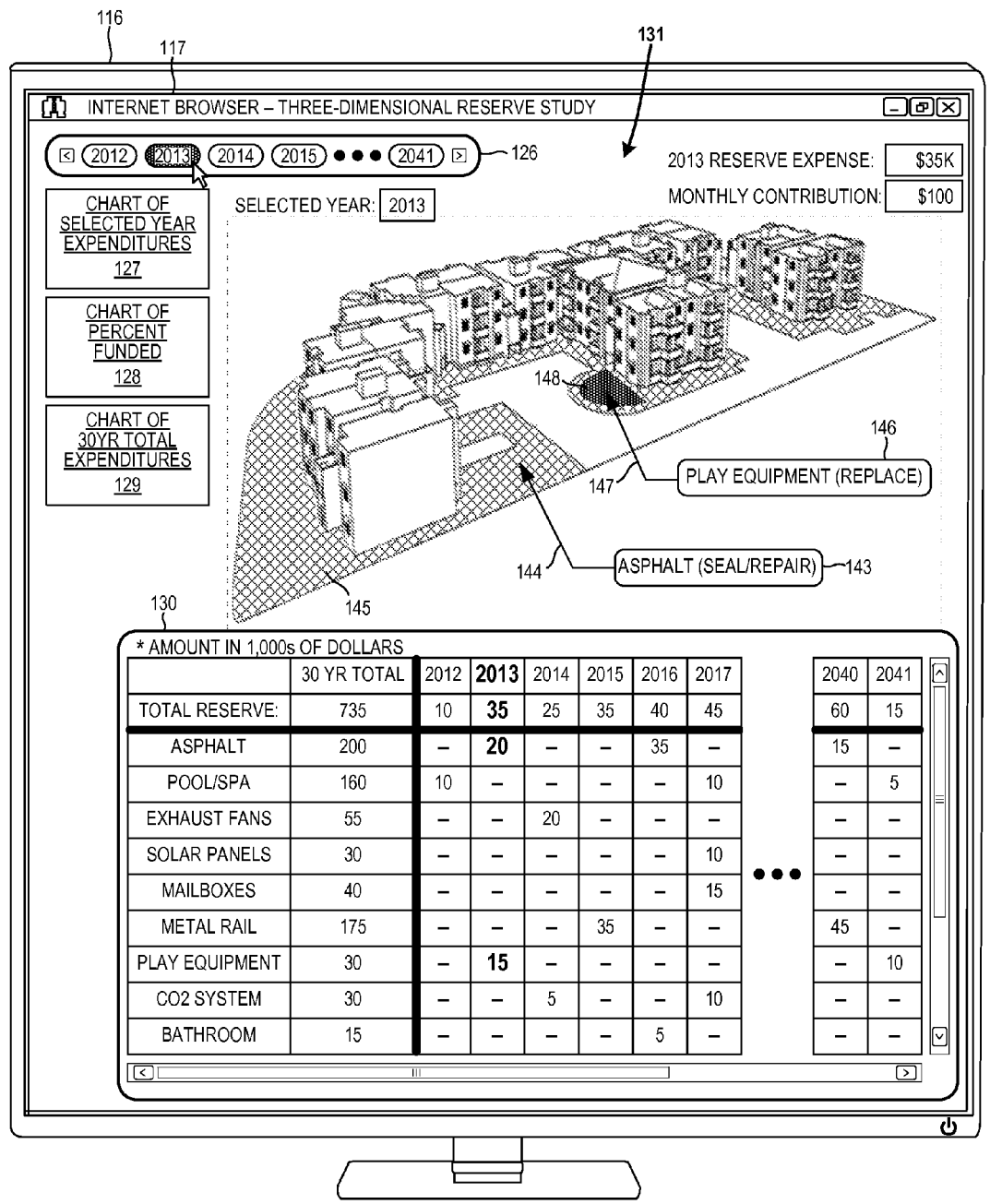
FIG. 7 is a diagram of the three-dimensional reserve study web page 131 rendered on display 116 showing graphical elements 143-148 for another selected year.

FIG. 7 is a diagram of the three-dimensional reserve study web page 131 rendered on display 116 showing graphical elements 143-148 for another selected year. The user 114 selects year "2013" from the navigation bar 126. The three-dimensional reserve study web page 131 detects the selection of the year "2013" and provides graphical elements 143-148 having reserve component information in connection with the selected year "2013". In this example, the graphical element 143 is a label "ASPHALT (SEAL/REPAIR)" indicating that in selected year 2013, the asphalt reserve component will need to be replaced thereby yielding a cost on the reserve of the CID. The replacement cost is twenty thousand dollars as indicated in chart 130. The graphical element 144 is a line and arrow identifying the location of where the asphalt reserve component is located on the CID. The graphical element 145 is shading also for identifying the location of where the asphalt reserve component is located on the CID.

Similarly, the graphical element 146 is a label "PLAY EQUIPMENT (REPLACE)" indicating that in selected year 2013, the play equipment reserve component will need to be replaced thereby yielding a cost on the reserve of the CID. The replacement cost is fifteen thousand dollars as indicated in chart 130. The graphical element 147 is a line and arrow identifying the location of where the play equipment reserve component is located on the CID. The graphical element 148 is shading also for identifying the location of where the play equipment reserve component is located on the CID. The total reserve expense of thirty-five thousand dollars for the selected year "2013" is presented to the user 114 both in chart 130 and in the upper right corner of the three-dimensional reserve study web page 131. The recommended monthly reserve contribution per owner of one hundred dollars for the selected year 2013 is also indicated in the upper right corner of the three-dimensional reserve study web page 131.

Figure 8:
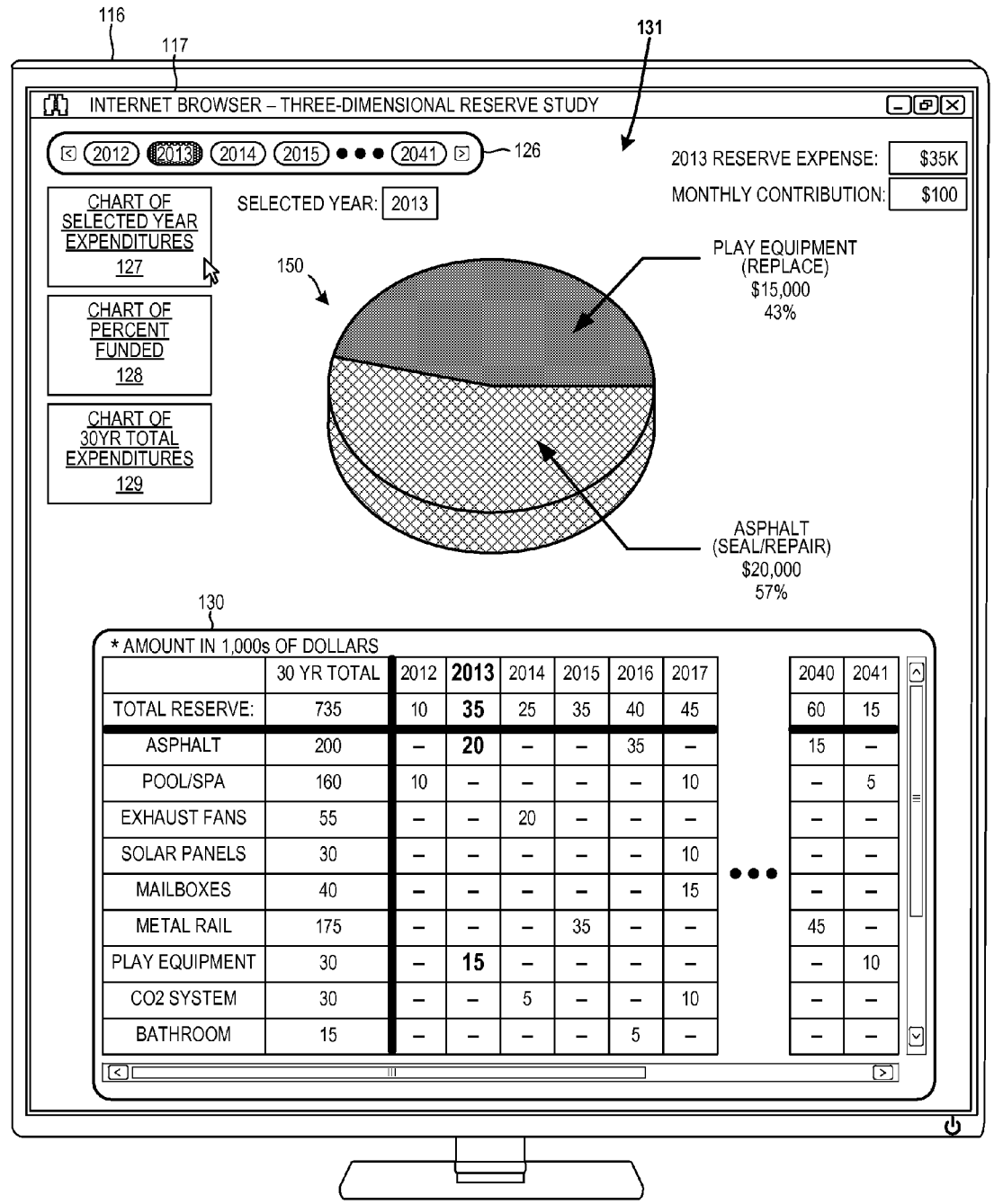
FIG. 8 is a more detailed diagram of the chart 127.

FIG. 8 is a more detailed diagram of the chart 127. Reference numeral 150 identifies an enlarged version of the chart 127 shown on the left side of the three-dimensional reserve study web page 131. The chart 150 is a graphical element that presents reserve component information to the user 114 for the selected year 2013. The chart 150 indicates that the asphalt reserve component will cost twenty thousand dollars to seal and repair and accounts for fifty-seven percent of the reserve costs for the selected year 2013. The chart 150 also indicates that the play equipment reserve component will cost fifteen thousand dollars to replace and accounts for forty-three percent of the reserve costs for the selected year 2013.

Figure 9:
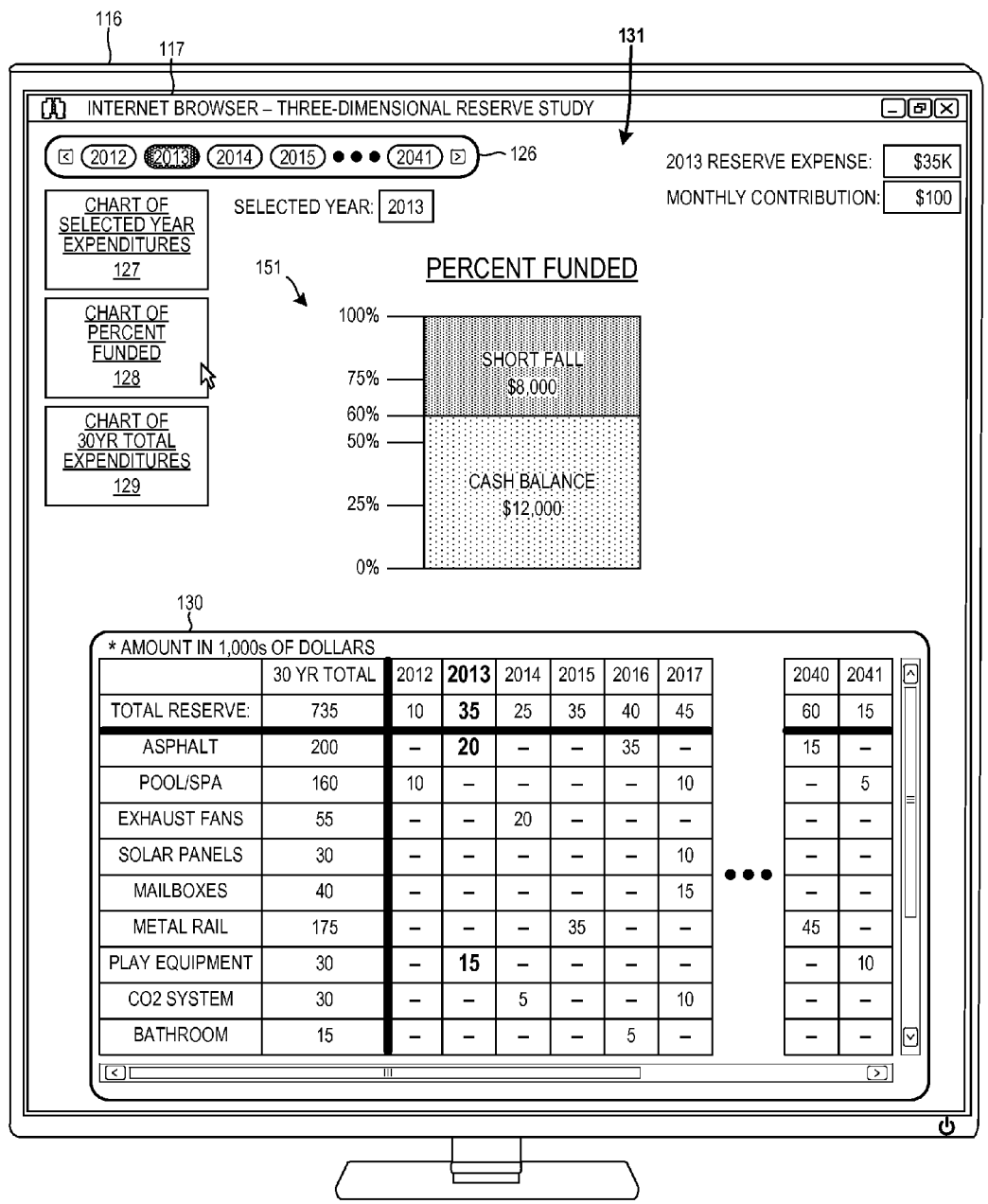
FIG. 9 is a more detailed diagram of the chart 128.

FIG. 9 is a more detailed diagram of the chart 128. Reference numeral 151 identifies an enlarged version of the chart 128 shown on the left side of the three-dimensional reserve study web page 131. The chart 151 indicates a percentage of the actual reserve balance to the fully funded balance for the selected year 2013. According to the Reference numeral 150 identifies an enlarged version of the chart 127 shown on the left side of the three-dimensional reserve study web page 131, an additional eight-thousand dollars should be contributed to the reserve balance in the selected year "2013" to avoid a reserve deficit.

Figure 10:
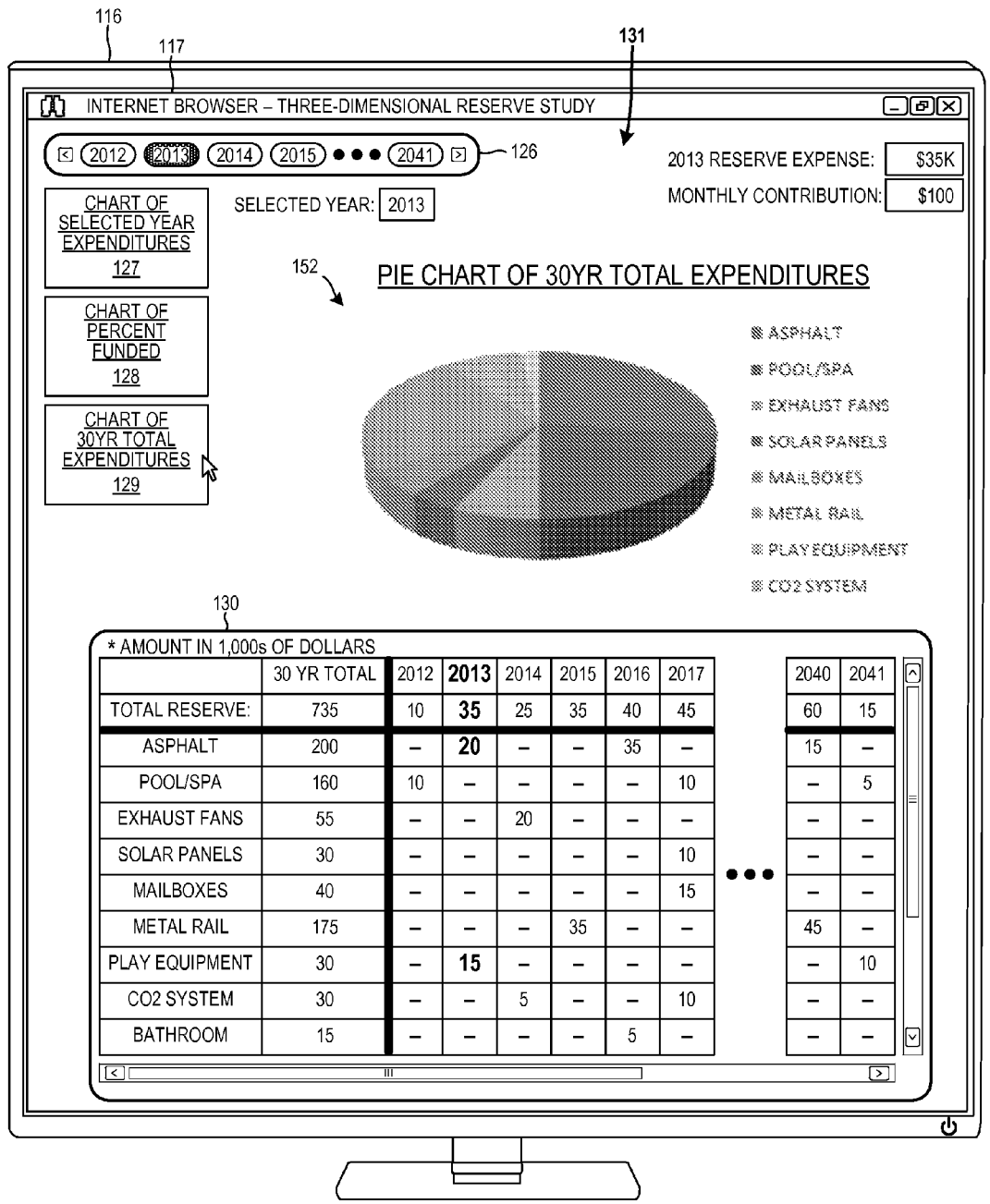
FIG. 10 is a more detailed diagram of the chart 129.

FIG. 10 is a more detailed diagram of the chart 129. Reference numeral 152 identifies an enlarged version of the chart 129 shown on the left side of the three-dimensional reserve study web page 131. The chart 152 is a pie chart showing an estimated percentage of the total expenditures that will be spent on each of the reserve components 139 throughout the thirty year period of the reserve study.

Figure 11:
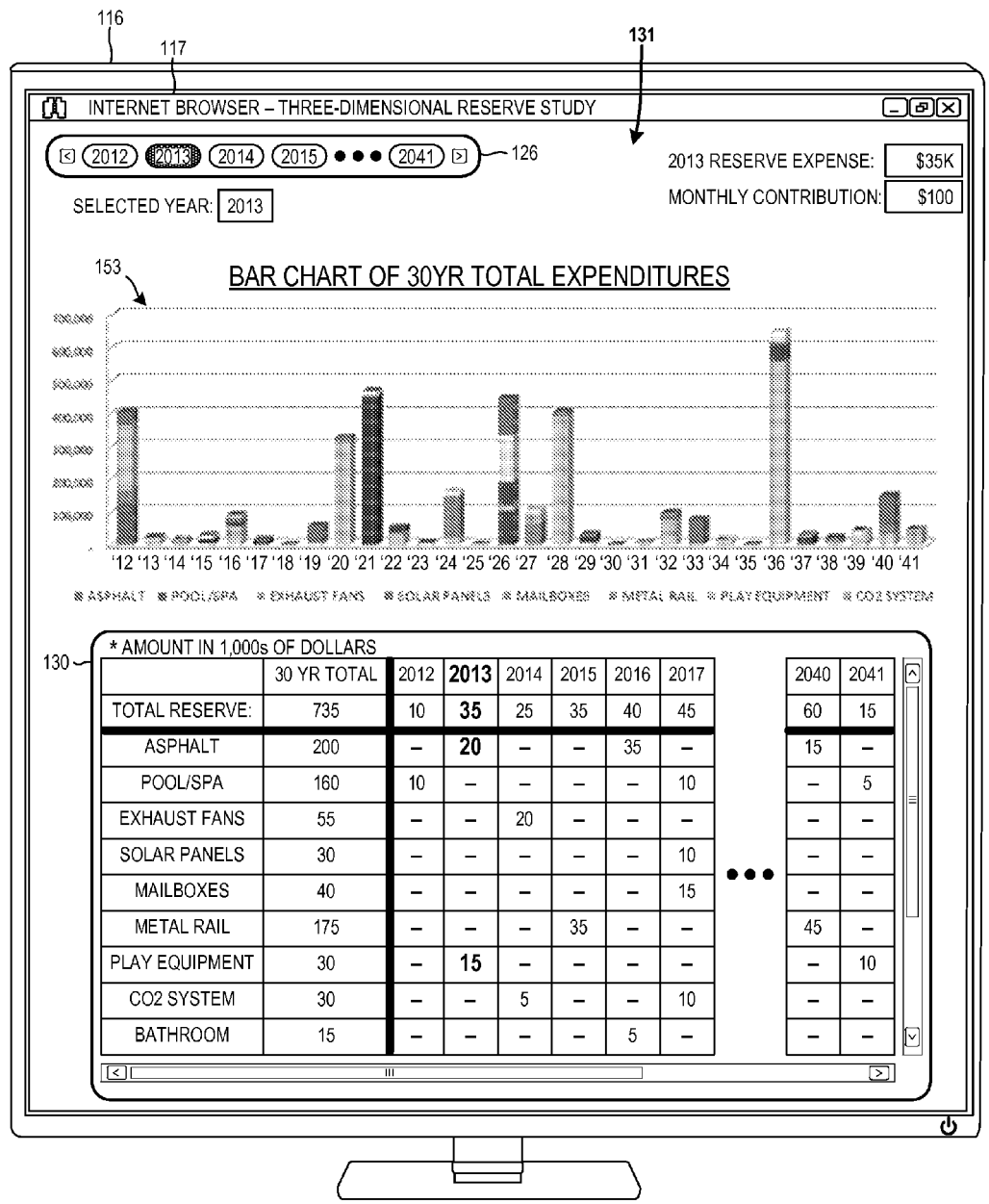
FIG. 11 is a detailed diagram of another example of the chart 129.

FIG. 11 is a detailed diagram of another example of the chart 129. Reference numeral 153 identifies an enlarged version of another example of the chart 129 shown on the left side of the three-dimensional reserve study web page 131. The chart 153 is a bar chart showing an estimated percentage of the total expenditures that will be spent on each of the reserve components 139 in each year throughout the thirty year period of the reserve study.

Figure 12:
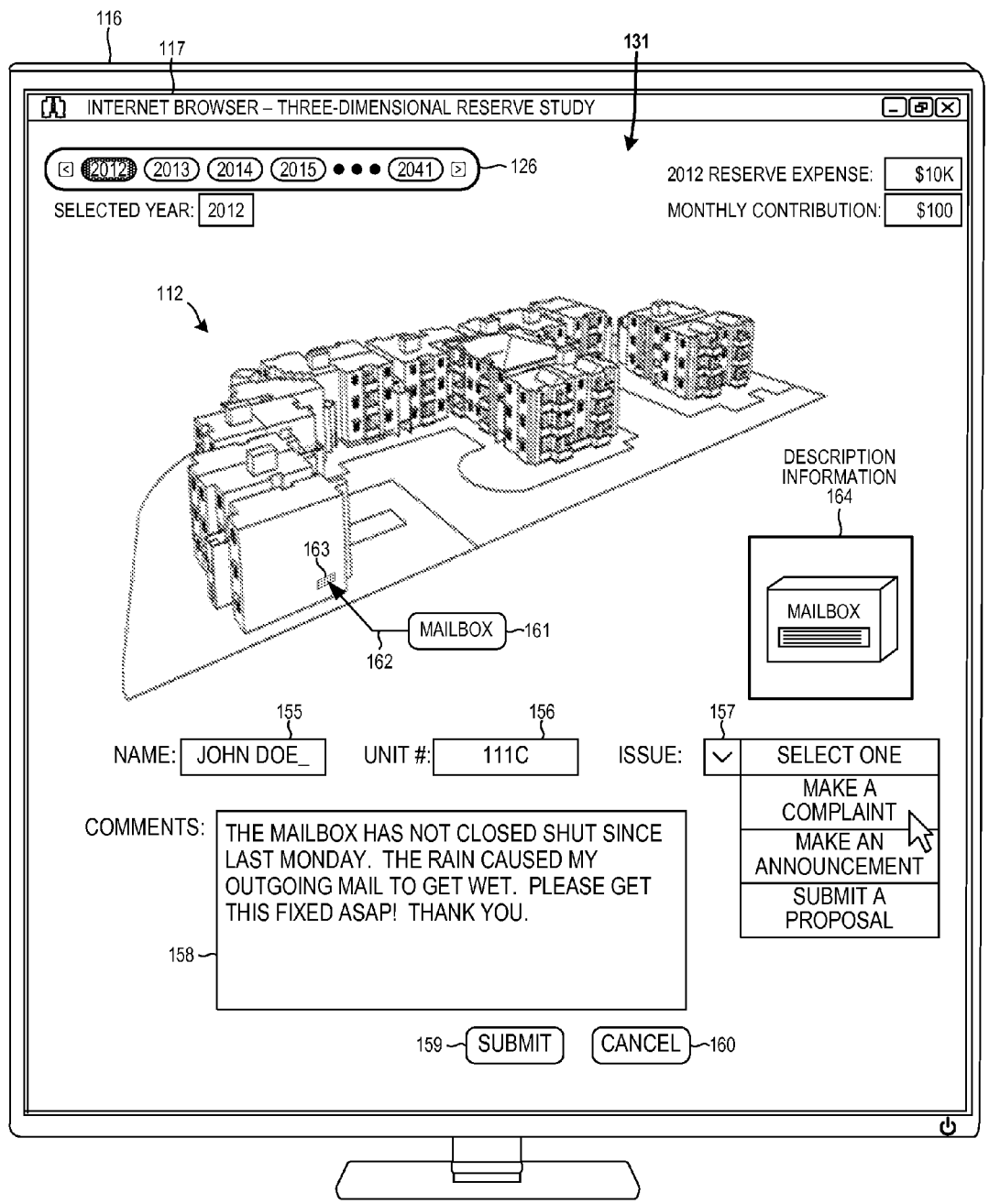
FIG. 12 is a diagram showing how the three-dimensional reserve study web page 131 is used to generate a complaint in accordance with another novel aspect.

FIG. 12 is a diagram showing how the three-dimensional reserve study web page 131 is used to generate a complaint in accordance with another novel aspect. The three-dimensional reserve study web page 131 provides a mechanism for a user to generate a complaint by supplying input via input field elements 155-160. The user 114 selects the mailbox reserve component by selecting the mailbox present on the three-dimensional line art diagram 112. The graphical elements 161-164 are rendered on the display indicating that the mailbox reserve component is selected. The user 114 inputs a name into input field element 155, a unit identification number into input field element 156, and selects "MAKE A COMPLAINT" in the input field element 157. The user 114 inputs a textual description of the complaint into input field element 158. The user 114 selects the input field element 159 to submit the complaint thereby causing the Internet browser 117 to generate a POST request thereby communicating the complaint to the communication module 118 of the application server 109 (see FIG. 1). The set of processor executable instructions 124 executing on the application server 109 processes the received POST request containing the complaint and stores the received complaint in the database 110. The set of processor executable instructions 124 executing on the application server 109 causes a notification to be generated that is communicated to the CID management (for example, the HOA board members). In one example, the notification is an email communication that the set of executable instructions 124 causes the application server 109 to communicate to the CID management (for example, the HOA board members). In another example, the notification is a text message communication that the set of executable instructions 124 causes the application server 109 to communicate to a mobile device of each of the HOA board members.

Figure 13:
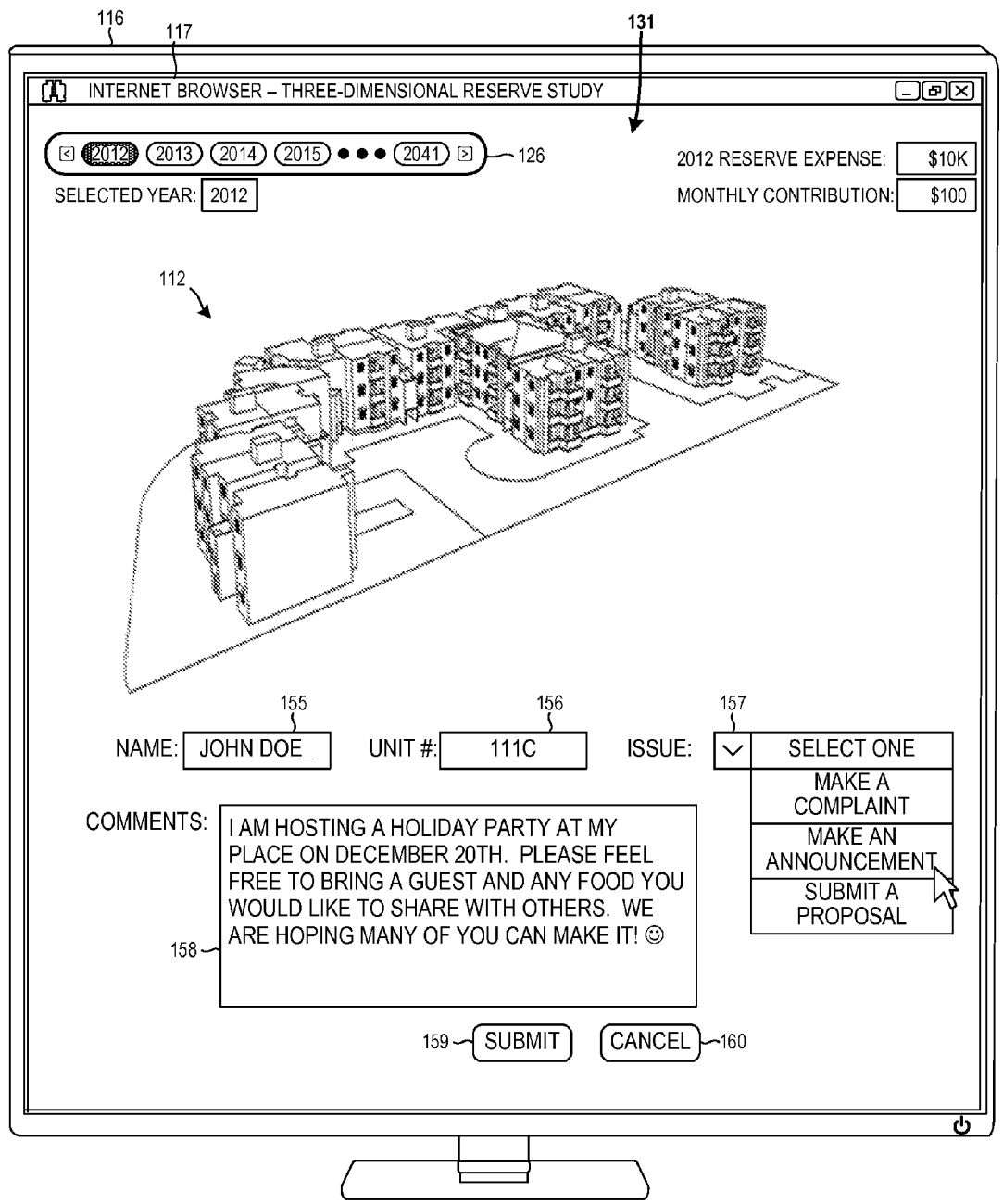
FIG. 13 is a diagram showing how the three-dimensional reserve study web page 131 is used to generate an announcement in accordance with another novel aspect.

FIG. 13 is a diagram showing how the three-dimensional reserve study web page 131 is used to generate an announcement in accordance with another novel aspect. The three-dimensional reserve study web page 131 provides a mechanism for the user 114 to generate an announcement that is communicated to all other owners of the CID by supplying input via input field elements 155-160. The user 114 inputs a name into input field element 155, a unit identification number into input field element 156, and selects "MAKE AN ANNOUNCEMENT" in the input field element 157. The user 114 inputs a textual description of the announcement into input field element 158. The user 114 selects the input field element 159 to submit the announcement thereby causing the Internet browser 117 to generate a POST request thereby communicating the announcement to the communication module 118 of the application server 109 (see FIG. 1). The set of processor executable instructions 124 executing on the application server 109 processes the received POST request containing the announcement and stores the received announcement in the database 110. The set of processor executable instructions 124 executing on the application server 109 causes a notification to be generated that is communicated to the other owners of the CID. In one example, the notification is an email communication that the set of executable instructions 124 causes the application server 109 to communicate to the other owners of the CID. In another example, the notification is a text message communication that the set of executable instructions 124 causes the application server 109 to communicate to a mobile device of the other owners of the CID.

Figure 14:
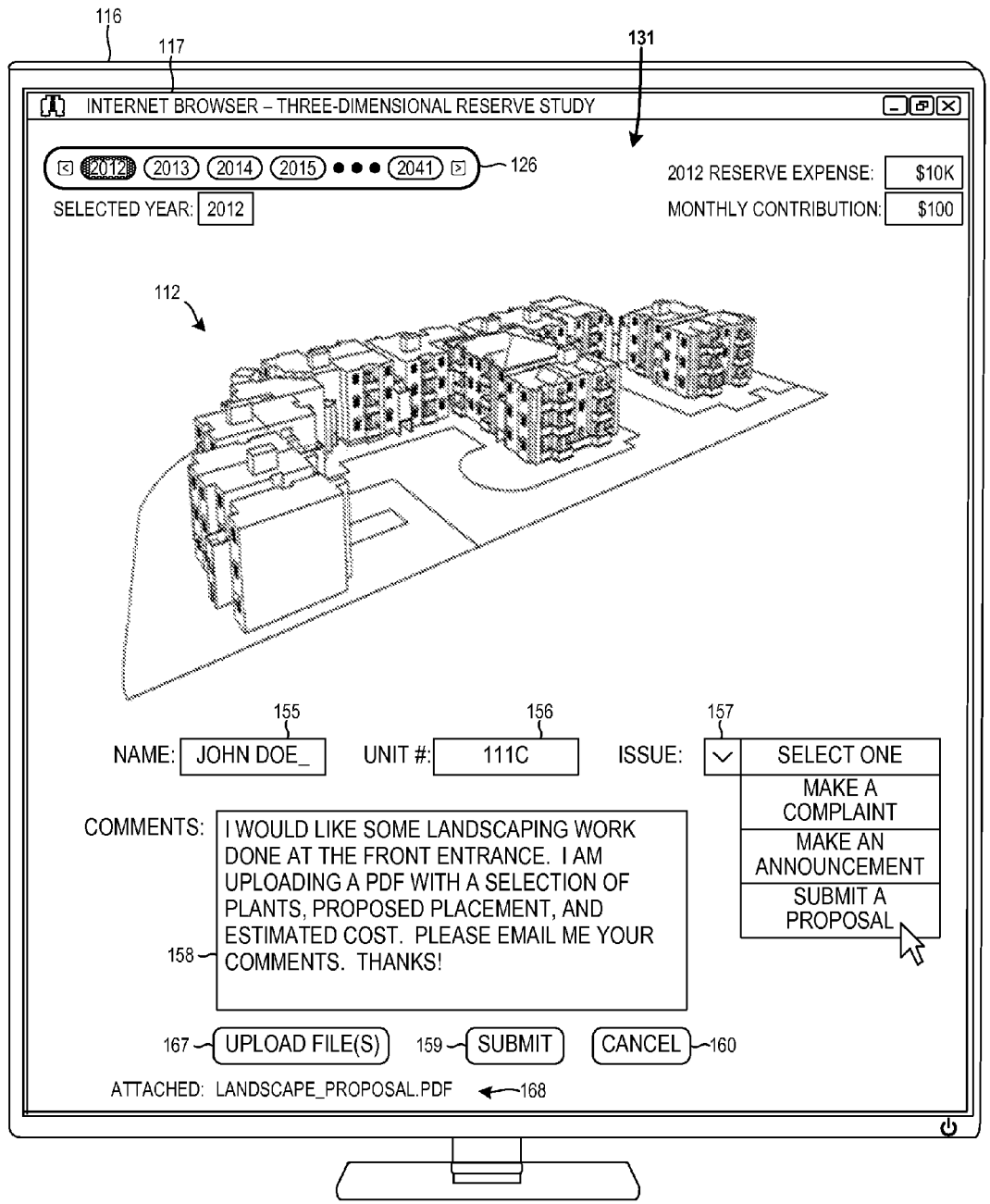
FIG. 14 is a diagram showing how the three-dimensional reserve study web page 131 is used to generate a proposal in accordance with another novel aspect.

FIG. 14 is a diagram showing how the three-dimensional reserve study web page 131 is used to generate a proposal in accordance with another novel aspect. The three-dimensional reserve study web page 131 provides a mechanism for the user 114 to generate a proposal that is communicated and accessible to all other owners and management of the CID by supplying input via input field elements 155-160 and 167. The user 114 inputs a name into input field element 155, a unit identification number into input field element 156, and selects "SUBMIT A PROPOSAL" in the input field element 157. The user 114 inputs a textual description of the proposal into input field element 158. The user 114 selects the input field element 167 to upload a file. The label 168 indicates that the user 114 uploaded a PDF version of a document entitled "LANDSCAPE_PROPOSAL.PDF". The user 114 selects the input field element 159 to submit the proposal thereby causing the Internet browser 117 to generate a POST request thereby communicating the proposal and PDF document to the communication module 118 of the application server 109 (see FIG. 1). The set of processor executable instructions 124 executing on the application server 109 processes the received POST request containing the proposal and PDF document and stores the received the proposal and PDF document in the database 110. The set of processor executable instructions 124 executing on the application server 109 causes a notification to be generated that is communicated to the other owners and the management of the CID. In one example, the notification is an email communication that the set of executable instructions 124 causes the application server 109 to communicate to the other owners and the management of the CID. In another example, the notification is a text message communication that the set of executable instructions 124 causes the application server 109 to communicate to a mobile device of the other owners and the management of the CID. The owners and the management of the CID access the proposal by logging into the system as shown in FIG. 3, and the owners and the management of the CID view the proposal and provide comments or suggestions.

Figure 15:
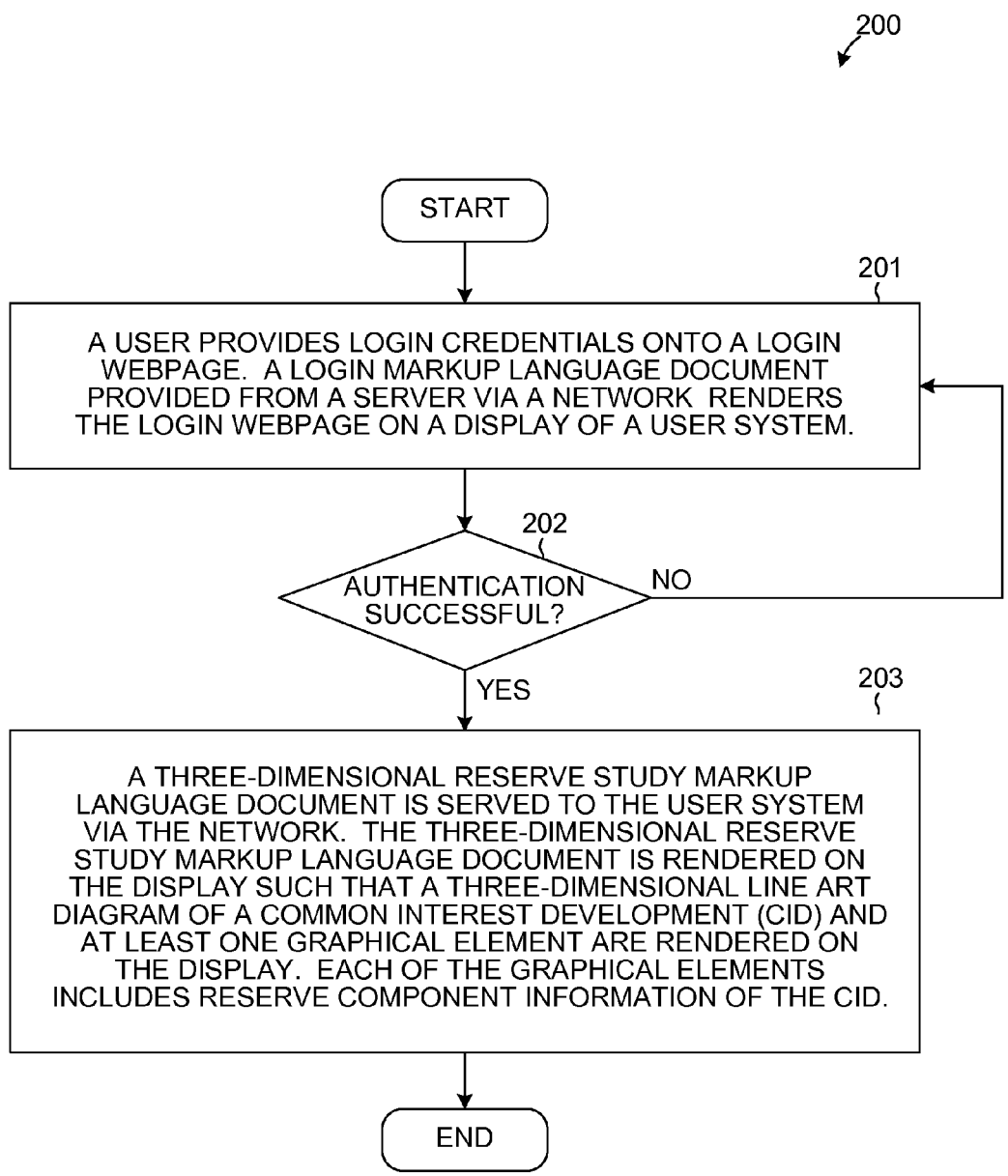
FIG. 15 is a flowchart of a method 200 in accordance with one novel aspect.

FIG. 15 is a flowchart of a method 200 in accordance with one novel aspect. In a first step (step 201), a user supplies login credentials onto a login web page. The login web page is rendered on a user system from a login markup language document provided from a server via a network. For example, in FIG. 3, the application server 109 serves the login HTML document 119. The Internet browser 117 that is executing on the user system 102 causes the login web page to be rendered on the display 116. The user 114 inputs the login credentials 113 into the input fields 120 and 121.

In a second step (step 302), the server attempts to authenticate the login credentials supplied from the user. If the login credentials are successfully authenticated, then the server serves the three-dimensional reserve study markup language document to the user system (step 203). If, however, the login credentials are not successfully authenticated, then the server again prompts the user for valid login credentials (step 201).

In a third step (step 203), after the login credentials are authenticated, the server serves the three-dimensional reserve study markup language document to the user system via the network. The three-dimensional reserve study markup language document is rendered on the display of the user system such that a three-dimensional line art diagram of a CID and at least one graphical element are rendered on the display. Each of the graphical elements includes reserve component information of the CID. For example, in FIG. 4, application server 109 serves a three-dimensional reserve study markup language document 125 to the user system 102 via network 111. The Internet browser 117 that is executing on the user system 102 causes the three-dimensional reserve study markup language document 125 to be rendered on the display 116, including the three-dimensional line art diagram 112 and the graphical elements 126-130. The graphical elements 126-130 include reserve component information of the CID as shown in more detail in FIGS. 5 and 8-11.

Figure 16:
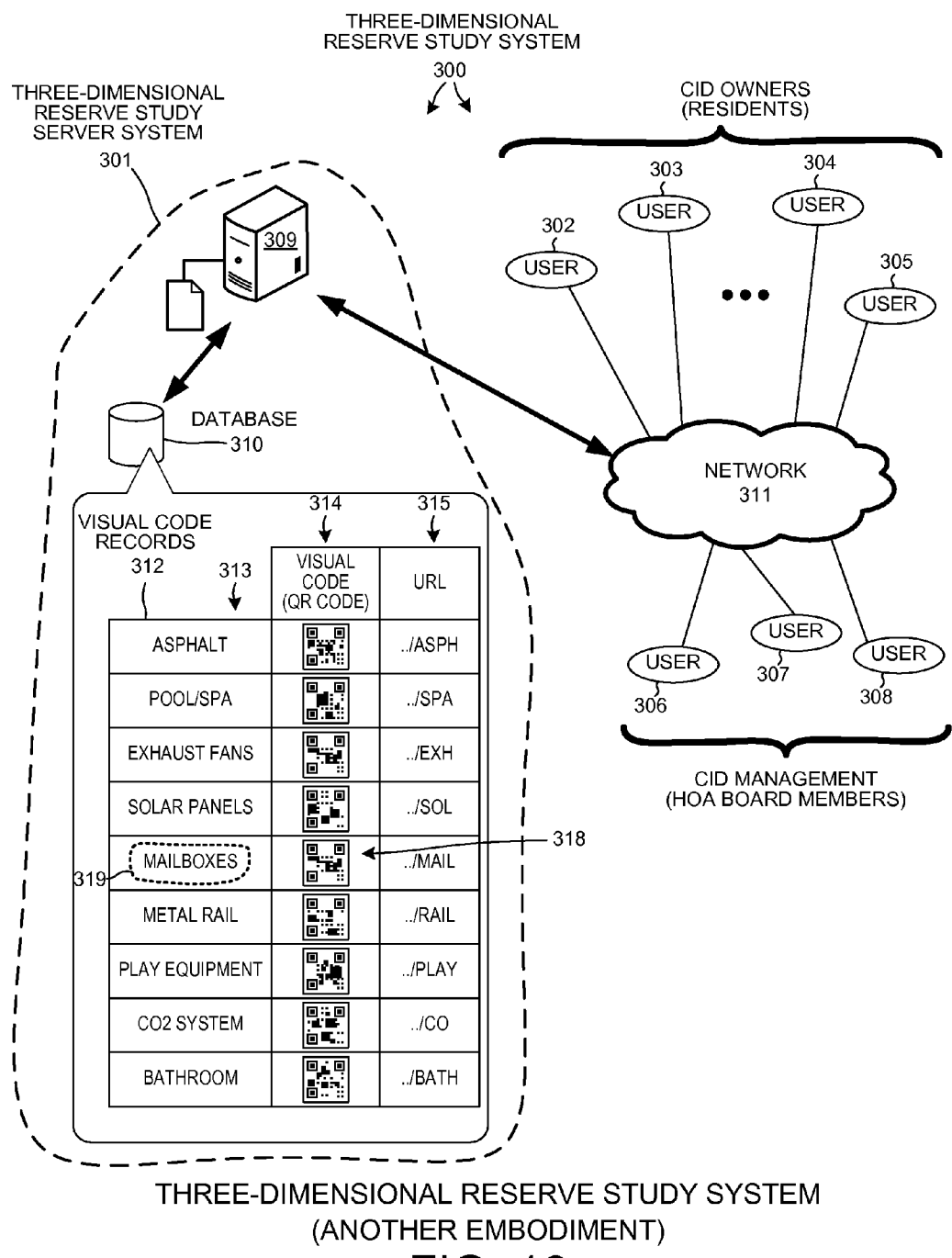
FIG. 16 is a diagram of another embodiment of a three-dimensional reserve study system 300.

FIG. 16 is a diagram of another embodiment of a three-dimensional reserve study system 300. The three-dimensional reserve study system 300 includes a three-dimensional reserve study server system 301 and network-enabled user systems 302-308. The three-dimensional reserve study server system 301 comprises an application server 309 and a database 310. The network-enabled user systems 302-308 communicate with the three-dimensional reserve study server system 301 via a network 311. The network-enabled user systems 302-305 are operated by individuals who have an ownership interest in a CID, and such owners typically reside in the CID. The network-enabled user systems 306-308 are operated by CID management. In this example, the CID is a condominium complex. The users of network-enabled user systems 302-305 reside in condominium units of the CID and the users of network-enabled user systems 306-308 are board members of a HOA of the CID.

Database 310 stores and maintains visual code table 312. In the embodiment of FIG. 16, the visual code is a quick response (QR) code. A unique URL is encoded in each of the QR codes. Reference numeral 313 identifies a reserve component column. Reference numeral 314 identifies a QR code column. Reference numeral 315 identifies a URL column. Each of the reserve components in table 312 has a QR code and a URL that is encoded in the QR code. The URL provides a link to web page served by the application server 309. The web page is a part of the three-dimensional reserve study and includes reserve component information for the reserve component having the affixed QR code. Each of the QR codes are printed and affixed to the respective reserve component shown in table 312. A user with a network-capable device having a camera scans the QR code that is affixed to a reserve component of interest to the user. The network-capable device decodes the QR code to obtain a URL. The URL is used to access a web page with the reserve component information of the reserve component that is of interest to the user.

The visual code table 312 is maintained such that the table 312 is updated to include a QR code and a URL for any new or replaced reserve component on the CID. For example, if a reserve component is added to the CID, the reserve component is registered with the application server 309 as follows. The three-dimensional reserve study is updated to include reserve component information for the new reserve component. A web page having the new reserve component information is generated. A QR code is generated that encodes a URL of the web page. The application server updates the visual code table 312 by inserting a an identifying label for the new reserve component into column 313, the generated QR code into column 314, and the URL into column 315. A member of the CID management prints the QR code for the new reserve component and affixes the QR code onto the new reserve component. Scanning the QR code with a network-enabled device will link the user to the web page of the new reserve component.

Figure 17:
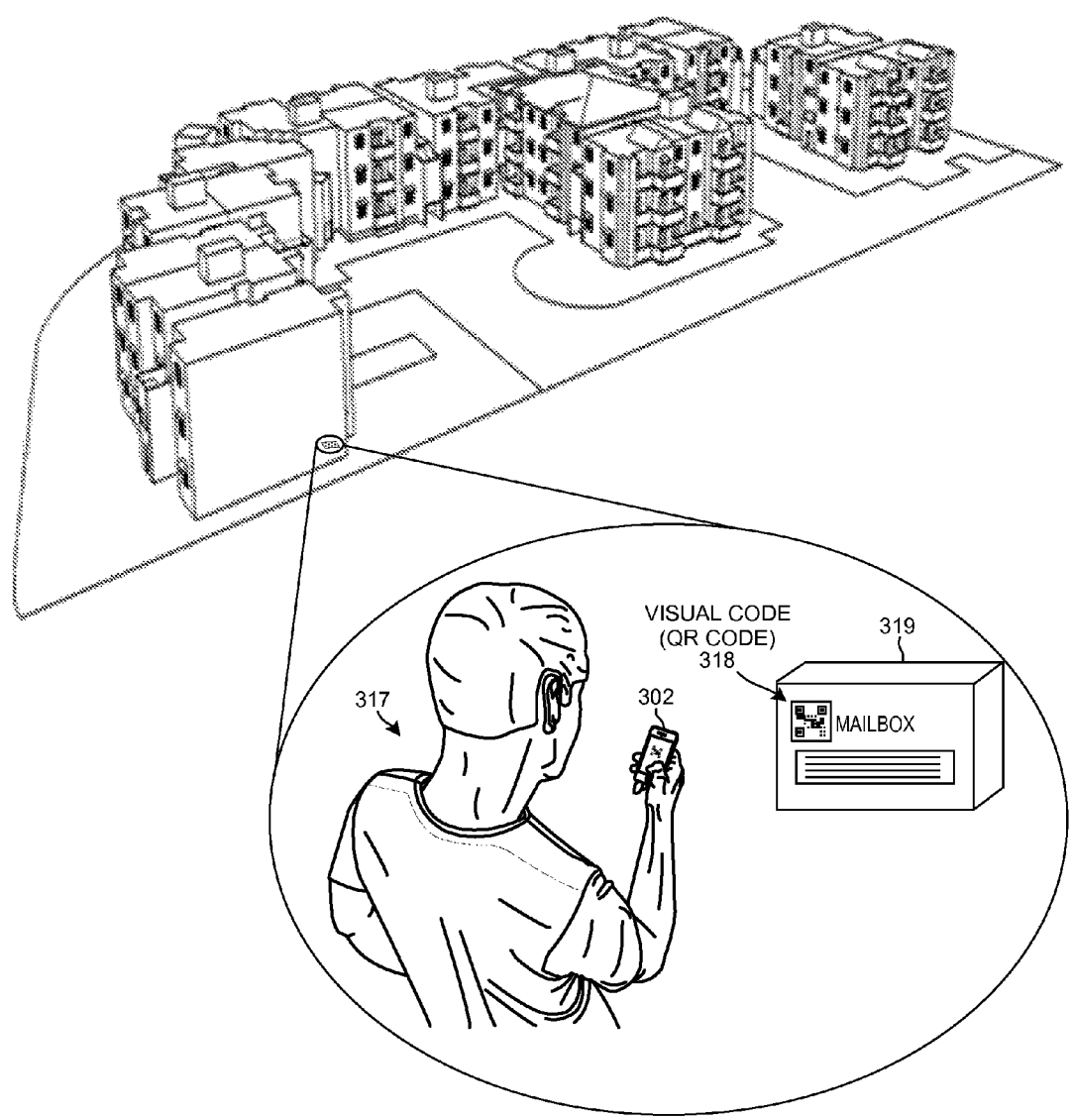
FIG. 17 is a diagram of a user 317 using a network-enable device 302 to scan a QR code 318 that is attached to a reserve component 319.

FIG. 17 is a diagram of a user 317 using a network-enable device 302 to scan a QR code 318 that is attached to a reserve component 319. In this example, the network-enable device 302 is a mobile handset and the reserve component 319 is a mailbox. The QR scanner is a mobile application that is readily available on most mobile handsets having a mechanism for capturing digital images. The QR scanner executing on the mobile device decodes the QR code 318 to obtain a URL. The mobile handset 302 accesses the URL as shown in FIG. 18.

Figure 18:
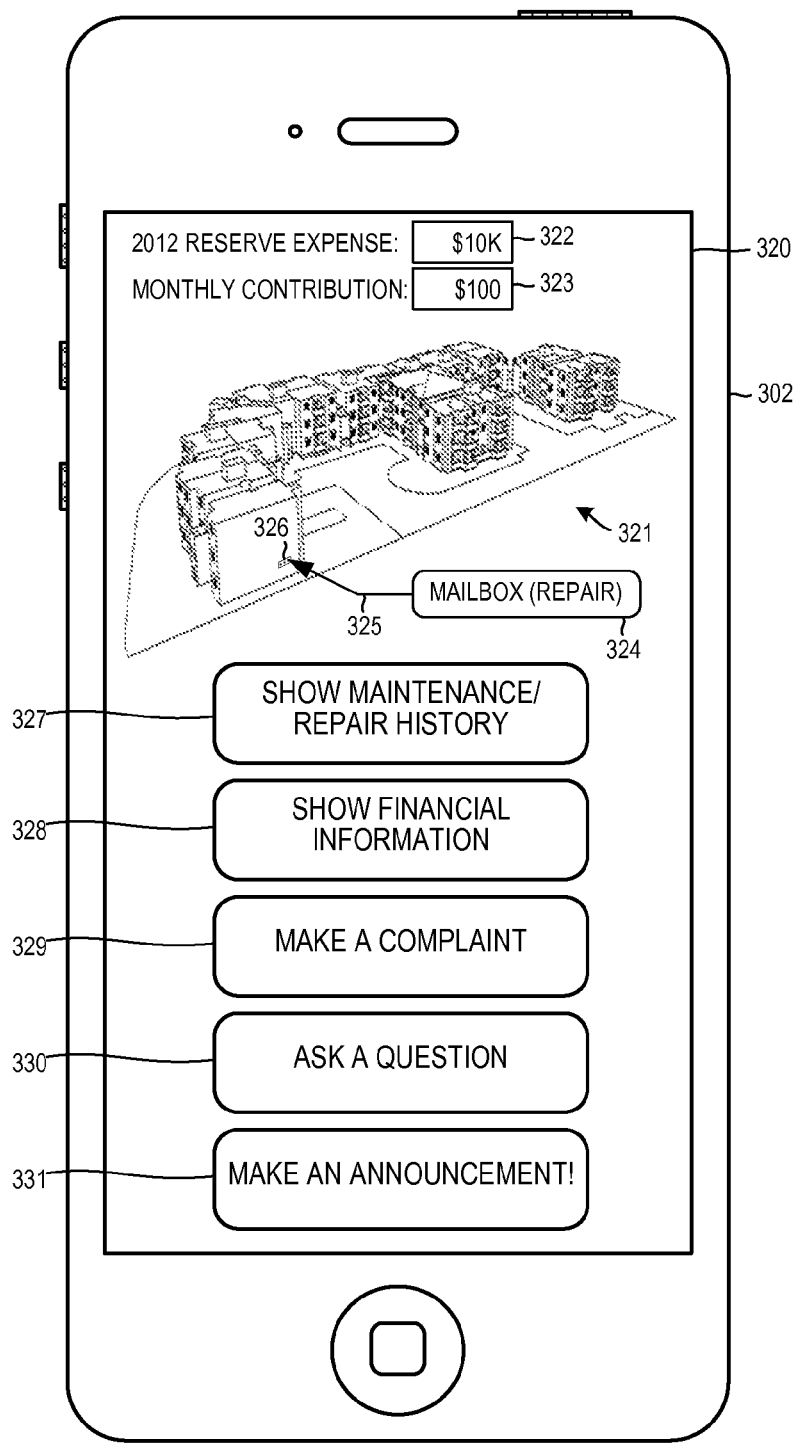
FIG. 18 is a diagram of a web page 320 that is accessed from the URL encoded in the QR code 318 of FIG. 17.

FIG. 18 is a diagram of a web page 320 that is accessed from the URL encoded in the QR code 318 of FIG. 17. The web page 320 shown in FIG. 18 is rendered from a markup language document served by the application server 309 and is part of the three-dimensional reserve study provided by the application server 309 (see FIG. 16). In this example, the web page 320 includes a three-dimensional line art diagram of the CID 321, graphical elements 322-326, and input elements 327-331. The graphical element 322 indicates the current year reserve expense for the scanned reserve component. The graphical element 323 indicates the current year monthly contribution the user 317 contributes to the reserve account of the CID. The graphical element 324 provides identification information for the scanned reserve component. The graphical element 325 provides location information for the scanned reserve component by indicating with a line and arrow where the reserve component is located on the three-dimensional line art diagram 321. The graphical element 326 also provides location information for the scanned reserve component by shading or coloring that indicates where the reserve component is located on the three-dimensional line art diagram 321. Input element 327 provides a link to a web page that shows maintenance or repair history of the reserve component. Input element 328 provides a link to a web page that shows financial information of the reserve component. Input element 329 provides a link to a web page that allows a user to make a complaint to the management of the CID regarding the reserve component. Input element 330 provides a link to generate a question for the management of the CID regarding the reserve component. Input element 331 provides a link to generate an announcement for the other owners and the management of the CID.

Figure 19:
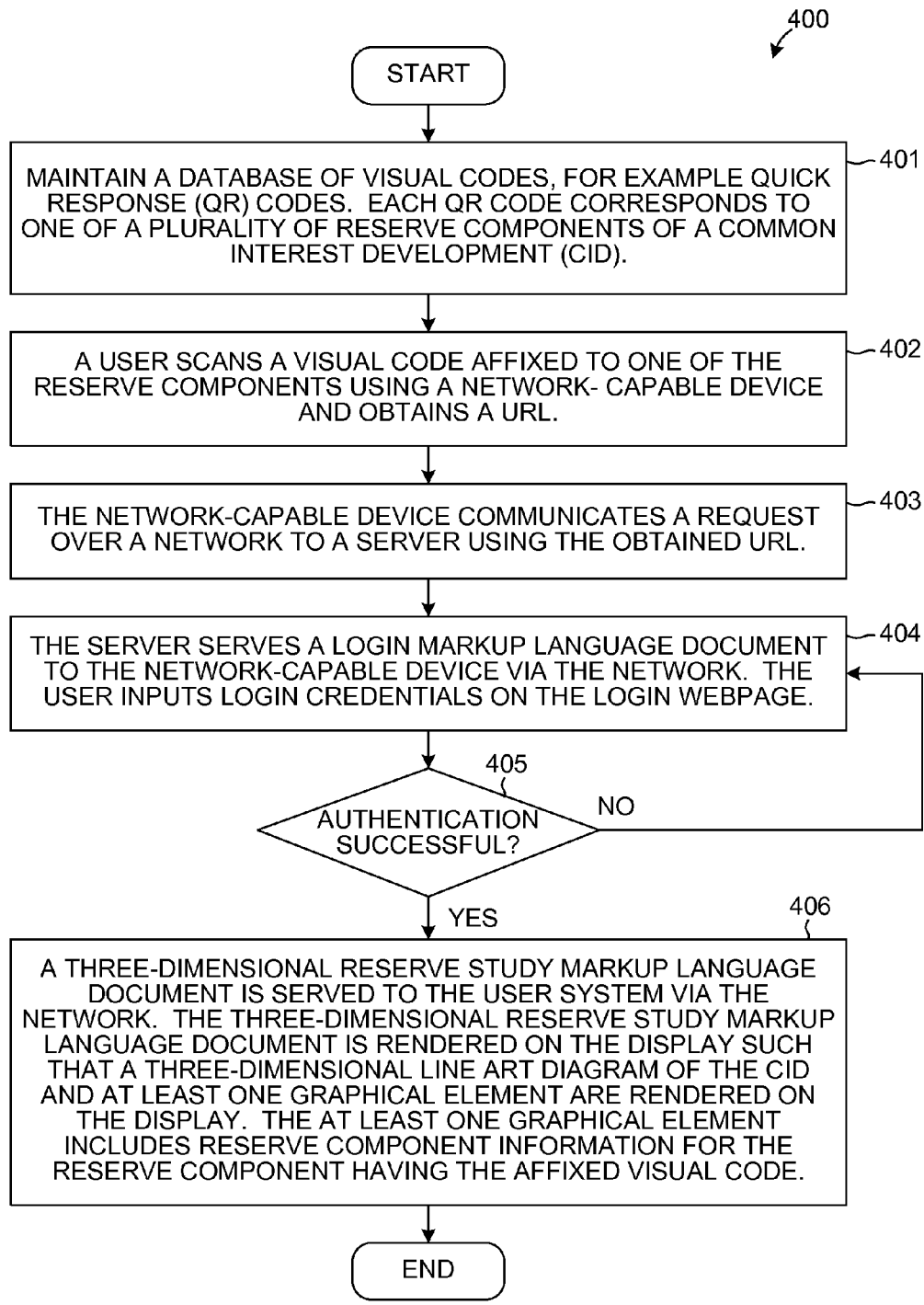
FIG. 19 is a flowchart 400 of a method in accordance with another novel aspect.

FIG. 19 is a flowchart 400 of a method in accordance with another novel aspect. In a first step (step 401), a database of visual codes is maintained. Each of the visual codes corresponds to a reserve component of a CID. For example, in FIG. 16, the database 310 stores a visual code table 312. The visual code table 312 is maintained such that all reserve components on the CID have a QR code and a URL in the table 312. Any replaced or added reserve component is issued a QR code that links to a URL for the replaced or added reserve component. The visual code table 312 is updated to reflect the replaced or added reserve component.

In a second step (step 402), a user scans a visual code that is affixed to the reserve component using a network-capable device. The network-capable device decodes the scanned visual code and obtains a URL. For example, in FIG. 17 the user 317 uses a mobile handset 302 to scan the QR code 318 that is affixed to the mailbox 319. The mobile handset 302 decodes the QR code 318 to obtain the URL "../MAIL" as shown in table 312.

In a third step (403), the network-capable device communicates a request over a network to a server using the URL. For example, in FIG. 16, mobile handset 302 communicates a GET request to the application server 309 via network 311.

In a fourth step (404), the server serves a login markup language document to the network-capable device via the network. The login markup language document renders a login web page on the display of the network-capable device. The user inputs login credentials on the login web page. For example, the server 309 communicates a login markup language document 119 as shown in FIG. 3. The login markup language document 119 is used to render a login web page on the mobile handset 302 of the user 317. The user 317 supplies a username and a password into the login web page.

In a fifth step (405), the server attempts to authenticate the login credentials supplied by the user. If the authentication is successful, then the server supplies a three-dimensional reserve study in a step 406. If, on the other hand, the authentication fails, then the application server prompts the user to enter valid login credentials. For example, the application server 309 of FIG. 16 attempts to authenticate the login credentials of user 317. If the authentication is successful, then the application server 309 serves a three-dimensional reserve study to the mobile handset 302. If, however, the authentication is unsuccessful, then the application server 309 prompts the user 317 to provide valid login credentials.

In a sixth step (406), a three-dimensional reserve study markup language document is served to the user system via the network. The three-dimensional reserve study markup language document is rendered on the display, including a three-dimensional line art diagram and at least one graphical element. The at least one graphical element includes reserve component information for the reserve component having the affixed visual code. For example, the application server 309 serves a mobile handset 302 with a three-dimensional reserve study markup language document. The three-dimensional reserve study markup language document is rendered as a web page on a display of the mobile handset 302 as shown in FIG. 18. The web page includes graphical element 324 that identifies the reserve component ("MAILBOX (REPAIR)") and graphical elements 325 and 326 that identify where the reserve component ("mailbox") is located on the three-dimensional line art diagram 321 of the CID.

Figure 20:
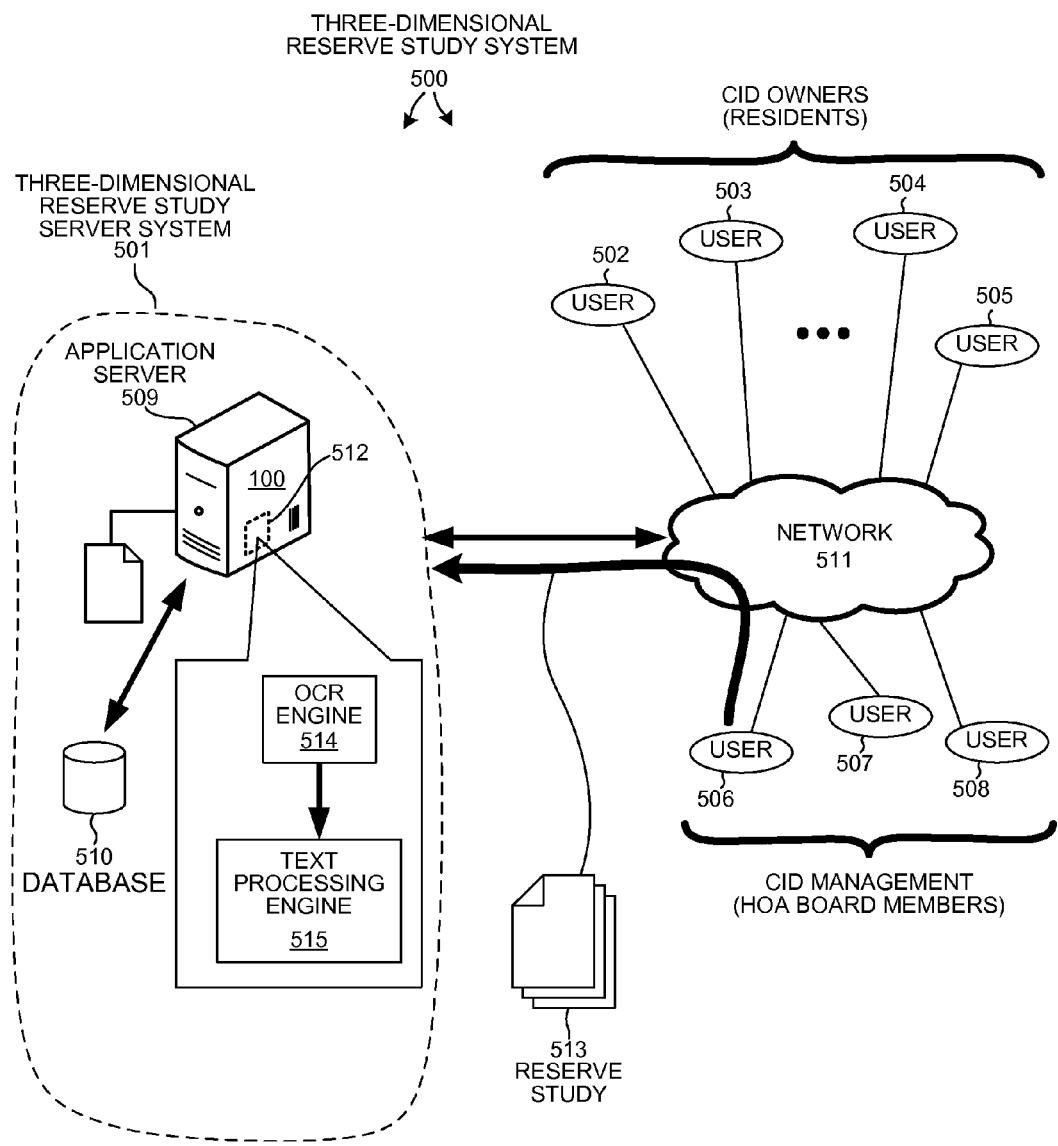
FIG. 20 is a diagram of another embodiment of a three-dimensional reserve study system 500.

FIG. 20 is a diagram of another embodiment of a three-dimensional reserve study system 500. The three-dimensional reserve study system 500 includes a three-dimensional reserve study server system 501 and network-enabled user systems 502-508. The three-dimensional reserve study server system 501 comprises an application server 509 and a database 510. The network-enabled user systems 502-508 communicate with the three-dimensional reserve study server system 501 via a network 511. The network-enabled user systems 502-505 are operated by individuals who have an ownership interest in a CID, and such owners typically reside in the CID. The network-enabled user systems 506-508 are operated by CID management. In this example, the CID is a condominium complex. The users of network-enabled user systems 502-505 reside in condominium units of the CID and the users of network-enabled user systems 506-508 are board members of a HOA of the CID.

The three-dimensional reserve study system 500 of FIG. 20 is similar to the three-dimensional reserve study system 100 of FIG. 1 except that the application sever 509 includes an amount of processor executable instructions 512 also for performing Optical Character Recognition (OCR) and text processing. A member of the CID management (for example, an HOA board member), uploads a reserve study document 513 to the application server via the network. The amount of processor executable instructions 512 comprise instructions for an OCR engine 514 and instructions for a text processing engine 515. The OCR engine 514 processes the uploaded reserve study document to obtain machine-readable text from the reserve study document 513. The text processing engine 515 uses the machine-readable text obtained from the OCR engine 514 to extract all necessary information from the reserve study to generate a thirty year cost table for all reserve components. One example of such a table is identified by reference numeral 130 of FIG. 5. By using the OCR engine 514 and the text processing engine 515, manual entry of monetary information for each reserve component of the reserve study is avoided. The HOA board member need only upload the reserve study document, and the amount of processor executable instructions 512 cause the monetary information for each reserve component to be extracted and stored in the database 510. The extracted monetary information is used to generate and serve the three-dimensional reserve study to the user system as shown in FIG. 4.

Although the present invention has been described in connection with certain specific embodiments for instructional purposes, the present invention is not limited thereto. In the example of FIG. 5, the graphical elements are images and text, however, in other embodiments, the graphical element is a button that, when selected, an audio playback of reserve component information is initiated. In another example, the graphical element is a video element that provides a video and audio description of reserve component information. In another example, the graphical element is an animation that provides the reserve component information. Accordingly, various modifications, adaptations, and combinations of various features of the described embodiments can be practiced without departing from the scope of the invention as set forth in the claims.

What is claimed is:

1. A method comprising:
    (a) providing a interactive three-dimensional reserve study to a user system, wherein the interactive three-dimensional reserve study is rendered on a display of the user system, wherein the interactive three-dimensional reserve study comprises a three-dimensional line art diagram of a Common Interest Development (CID), a first graphical element that corresponds to a first reserve component of the CID, and a second graphical element that corresponds to a second reserve component of the CID, wherein the first reserve component is different from the second reserve component, wherein the first graphical element includes a first amount of color or shading that is overlaid above a first portion of the three-dimensional line art diagram of the CID at a first location, wherein the first graphical element is configured to respond to user input, wherein the second graphical element includes a second amount of color or shading that is overlaid above a second portion of the three-dimensional line art diagram of the CID at a second location, wherein the second graphical element is configured to respond to user input, and wherein the first location is distinct from the second location;
    (b) in response to detecting a first input event on the first graphical element, presenting a first amount of reserve component information of the first reserve component on the display of the user system; and
    (c) in response to detecting a second input event on the second graphical element, presenting a second amount of reserve component information of the second reserve component on the display of the user system, wherein the interactive three-dimensional reserve study is provided on a single web page.

2. The method of claim 1, wherein the reserve component information is selected from the group consisting of: identification information that identifies a reserve component of the CID, location information indicating where a reserve component is located on the CID, temporal information indicating a year when a reserve component will yield an expense, description information that describes a reserve component, and financial information indicating a monetary value associated with a reserve component.

3. The method of claim 1, wherein the CID is selected from the group consisting of: residential real estate, and commercial real estate.

4. The method of claim 1, wherein the user system is selected from the group consisting of: a personal computer, a mobile communication device, a tablet computer, and a network capable device.

5. The method of claim 1, wherein only one of the first amount of reserve component information or the second amount of reserve component information is presented on the display at a time.

6. The method of claim 4, wherein the input event is selected from the group consisting of: a click event generated by an input device, and a touch event generated by user contact with the display of the user system.

7. The method of claim 1, further comprising:
    (d) serving a login markup language document to the user system via the network and receiving login credentials via the network, wherein step (d) occurs before step (a), and wherein step (a) occurs only if the login credentials are authenticated.

8. A non-transitory computer-readable medium storing instructions that, when executed by a processor, cause the processor to perform a method, the method comprising:

(a) providing a interactive three-dimensional reserve study to a user system via a network, wherein the interactive three-dimensional reserve study is renderable on a display of the user system such that a three-dimensional line art diagram of a Common Interest Development (CID) and at least two graphical elements are rendered on the display, wherein a first graphical element of the at least two graphical elements corresponds to a first reserve component of the CID, wherein a second graphical element of the at least two graphical elements corresponds to a second reserve component of the CID, wherein the first reserve component is different from the second reserve component, wherein the first graphical element includes a first amount of color or shading that is overlaid above a first portion of the three-dimensional line art diagram of the CID, wherein the first graphical element is configured to respond to user input, wherein the second graphical element includes a second amount of color or shading that is overlaid above a second portion of the three-dimensional line art diagram of the CID, wherein the second graphical element is configured to respond to user input, and wherein the first portion is different from the second portion;

(b) in response to detecting a first input event on the first graphical element, presenting a first amount of reserve component information of the first reserve component on the display of the user system; and (c) in response to detecting a second input event on the second graphical element, presenting a second amount of reserve component information of the second reserve component on the display of the user system, wherein the interactive three-dimensional reserve study is provided on a single web page.

9. The non-transitory computer-readable medium of claim 8, wherein the reserve component information is selected from the group consisting of: identification information that identifies a reserve component of the CID, location information indicating where a reserve component is located on the CID, temporal information indicating a year when a reserve component will yield an expense, description information that describes a reserve component, and financial information indicating a monetary value associated with a reserve component.

10. The non-transitory computer-readable medium of claim 8, wherein the CID is selected from the group consisting of: residential real estate, and commercial real estate.

11. The non-transitory computer-readable medium of claim 8, wherein the user system is selected from the group consisting of: a personal computer, a mobile communication device, a tablet computer, and a network capable device.

12. The non-transitory computer-readable medium of claim 8, wherein the non-transitory computer-readable medium also stores a visual code table having a plurality of visual codes, wherein each visual code corresponds to a reserve component having a printed version of the visual code affixed to the reserve component, and wherein when a network-capable device having a camera scans one of the visual codes, the network-capable device is presented with reserve component information of a reserve component associated with the visual code.

13. The non-transitory computer-readable medium of claim 8, wherein the input event is selected from the group consisting of: a click event generated by an input device, and a touch event generated by user contact with the display.

14. The non-transitory computer-readable medium of claim 8, the method further comprising:

(d) serving a login markup language document to the user system via the network and receiving login credentials via the network, wherein step (d) occurs before step (a), and wherein step (a) occurs only if the login credentials are authenticated.

15. A system comprising:
a database that stores a three-dimensional line art diagram of a Common Interest Development (CID); and
a software application executing on an application server, wherein software application causes a interactive three-dimensional reserve study to be provided to a user system via a network, wherein the interactive three-dimensional reserve study is renderable on a display of the user system, wherein the interactive three-dimensional reserve study comprises a first graphical element, a second graphical element, and the three-dimensional line art diagram of the CID stored in the database, wherein the first graphical element corresponds to a first reserve component of the CID, wherein a second graphical element corresponds to a second reserve component of the CID, wherein the first reserve component is different from the second reserve component, wherein the first graphical element includes a first amount of color or shading that is overlaid above a first portion of the three-dimensional line art diagram of the CID, wherein the first graphical element is configured to respond to user input, wherein the second graphical element includes a second amount of color or shading that is overlaid above a second portion of the three-dimensional line art diagram of the CID, wherein the second graphical element is configured to respond to user input, wherein the first portion is separate from the second portion, wherein the software application causes a first amount of reserve component information of the first reserve component to be presented on the display of the user system when a first input event on the first graphical element is detected, wherein the software application causes a second amount of reserve component information of the second reserve component to be presented on the display of the user system when a second input event on the second graphical element is detected, and wherein the second input event occurs after the first input event.

16. The system of claim 15, wherein the reserve component information is selected from the group consisting of: identification information that identifies a reserve component of the CID, location information indicating where a reserve component is located on the CID, temporal information indicating a year when a reserve component will yield an expense, description information that describes a reserve component, and financial information indicating a monetary value associated with a reserve component.

17. The system of claim 15, wherein the CID is selected from the group consisting of: residential real estate, and commercial real estate.

18. The system of claim 15, wherein the user system is selected from the group consisting of: a personal computer, a mobile communication device, a tablet computer, and a network capable device.

19. The system of claim 15, wherein the interactive three-dimensional reserve study is provided on a single web page.

20. The system of claim 15, wherein the input event is selected from the group consisting of: a click event generated by an input device, and a touch event generated by user contact with the display.

* * * * *